United States Patent
Ichikawa

(10) Patent No.: US 11,816,516 B2
(45) Date of Patent: Nov. 14, 2023

(54) STORAGE MEDIUM STORING COMPUTER-READABLE INSTRUCTIONS FOR GENERATING PROCESSED IMAGE DATA REPRESENTING PROCESSED IMAGE IN WHICH GAP AREA IS ARRANGED WITHIN RANGE INCLUDING LONGITUDINAL CENTER POSITION THEREOF

(71) Applicant: BROTHER KOGYO KABUSHIKI KAISHA, Nagoya (JP)

(72) Inventor: Yushi Ichikawa, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/815,811

(22) Filed: Jul. 28, 2022

(65) Prior Publication Data
US 2023/0036871 A1 Feb. 2, 2023

(30) Foreign Application Priority Data
Jul. 29, 2021 (JP) ................. 2021-124025

(51) Int. Cl.
*G06K 15/00* (2006.01)
*G06K 15/02* (2006.01)
(52) U.S. Cl.
CPC ......... *G06K 15/403* (2013.01); *G06K 15/005* (2013.01); *G06K 15/1868* (2013.01)
(58) Field of Classification Search
CPC ............... G06K 15/403; G06K 15/005; G06K 15/1868; G06K 15/1843; G06K 15/4065; G06F 3/1242; G06F 3/1264; G06F 3/1205; G06F 3/1252; G06F 3/1258
See application file for complete search history.

(56) References Cited

U.S. PATENT DOCUMENTS 9,126,440 B1\* 9/2015 Lotz ...................... G06F 3/1264
2011/0116134 A1\* 5/2011 Farrell ................. H04N 1/3872
358/1.18

FOREIGN PATENT DOCUMENTS

JP 2020-1358 A 1/2020

\* cited by examiner

*Primary Examiner* — Juan M Guillermety
(74) *Attorney, Agent, or Firm* — Kenealy Vaidya LLP

(57) ABSTRACT

A set of computer-readable instructions, when executed by a computer in an information processing device, causes the information processing device to perform: a setting process; and in response to receiving a print instruction in which a cut print setting is set: a generation process; and a transmission process. The setting process sets the cut print setting for printing an image on a sheet and dividing the printed sheet at a center position thereof. The generation process acquires image data representing a target image to generate processed image data representing a processed image in which a gap area is arranged within a range including the center position. No colorant is deposited in a region on a sheet corresponding to the gap area during the printer printing the processed image on the sheet. The transmission process transmits print data based on the processed image data and a cut command to the printer.

11 Claims, 19 Drawing Sheets

FIG. 9

PORTRAIT + NORMAL ORDER

PORTRAIT + REVERSE ORDER

LANDSCAPE + NORMAL ORDER

LANDSCAPE + REVERSE ORDER

LONG-EDGE BINDING + PORTRAIT

SHORT-EDGE BINDING + PORTRAIT

LONG-EDGE BINDING + LANDSCAPE

SHORT-EDGE BINDING + LANDSCAPE

PORTRAIT + NORMAL ORDER

PORTRAIT + REVERSE ORDER

LANDSCAPE + NORMAL ORDER

LANDSCAPE + REVERSE ORDER

LONG-EDGE BINDING + PORTRAIT

SHORT-EDGE BINDING + PORTRAIT

LONG-EDGE BINDING + LANDSCAPE

SHORT-EDGE BINDING + LANDSCAPE

STORAGE MEDIUM STORING COMPUTER-READABLE INSTRUCTIONS FOR GENERATING PROCESSED IMAGE DATA REPRESENTING PROCESSED IMAGE IN WHICH GAP AREA IS ARRANGED WITHIN RANGE INCLUDING LONGITUDINAL CENTER POSITION THEREOF

REFERENCE TO RELATED APPLICATIONS

This application claims priority from Japanese Patent Application No. 2021-124025 filed Jul. 29, 2021. The entire content of the priority application is incorporated herein by reference.

BACKGROUND ART

Printers having a cutting function for cutting sheets that have been printed are known in the art. Japanese Patent Application Publication No. 2020-001358 describes one example of an image-forming device provided with a cutting function. This conventional image-forming device generates image data representing a plurality of pages of images that have been laid out to be printed on a single sheet, performs printing based on the image data having this layout, and cuts the printed sheet into page units.

DESCRIPTION

There may be occasions when a user wishing to form printed matter on A5-size sheets only possesses A4-size sheets. In such cases, the user can print an image on the A4-size sheet and then manually cut the printed sheet in half to obtain the desired printed matter. On the other hand, the printer disclosed in the document described above can save the user much time and effort by printing images on an A4-size sheet and automatically cutting the sheet in half. However, if the colorant used for printing adheres to the cutting member when sheets are cut on the printer, this colorant may be transferred to subsequently cut sheets, may shorten the lifespan of the cutting member, and may cause other issues for which improvements are needed.

In view of the foregoing, it is an object of the present disclosure to provide a storage medium storing computer-readable instructions for controlling printers having a cutting function for cutting printed sheets that is capable of suppressing colorant from becoming deposited on the cutting member.

In order to attain the above and other objects, according to one aspect, the present disclosure provides a non-transitory computer-readable storage medium storing a set of computer-readable instructions installed on and executed by a computer in an information processing device. The information processing device includes: a user interface; a communication interface; and the computer. The user interface is configured to receive a user operation. The communication interface is configured to communicate with a printer. The printer has: a printing function; and a cutting function. The printing function is a function for printing an image on a sheet of a printing medium while conveying the sheet in a first direction parallel to a longitudinal direction of the sheet. The cutting function is a function for cutting the printed sheet on which the image is printed. The set of computer-readable instructions, when executed by the computer, causes the information processing device to perform: a setting process. The setting process is a process to set, in response to receiving an instruction through the user interface, a cut print setting for printing an image on a sheet having a first size and dividing the printed sheet on which the image is printed at a center position of the printed sheet in the first direction into a first portion and a second portion. The sheet has a predetermined width in a second direction orthogonal to the first direction. The first portion and the second portion have a second size. The set of computer-readable instructions, when executed by the computer, causes the information processing device to further perform: in response to receiving a print instruction in which the cut print setting is set: a generation process; and a transmission process. The generation process is a process to acquire image data representing a target image corresponding to the first size to generate processed image data based on the image data. The processed image data represents a processed image in which a gap area is arranged within a range including the center position in the first direction and extending over the predetermined width in the second direction. No colorant is deposited in a region on a sheet corresponding to the gap area during the printer printing the processed image on the sheet. The transmission process is a process to transmit print data based on the processed image data generated in the generation process and a cut command to the printer. The printer is configured to print the processed image on a sheet having the first size and cut the printed sheet on which the processed image is printed at the center position of the printed sheet in the first direction in response to receiving the print data and the cut command.

By executing the set of computer-readable instructions disclosed herein, the information processing device generates, from image data representing a target image having a first size, processed image data representing a processed image in which a gap area in which a printer does not deposit colorant is arranged within a range including a center position of the target image in the first direction and transmits print data based on the processed image data together with a cut command to the printer. In response to receiving the print data together with the cut command, the printer prints the processed image as is on a sheet based on the print data and cuts the printed sheet. Accordingly, the gap area in which no colorant is deposited is formed at the location to be cut by the printer, thereby suppressing colorant from adhering to a cutting member of the printer.

An information processing device that implements the functions of the set of computer-readable instructions described above and a control method for implementing the functions of the set of computer-readable instructions described above are also novel and useful.

The technique disclosed herein provides a storage medium storing computer-readable instructions for controlling a printer having a cutting function for cutting a printed sheet and improving image data to be transmitted to the printer.

FIG. 9 is an explanatory diagram illustrating one example of a guidance screen.

Next, an embodiment of the program according to the present disclosure will be described while referring to the accompanying drawings. The program disclosed in this embodiment is executed on a personal computer (hereinafter referred to as "PC") 1 that can be connected to a printer having a printing function.

Figure 1:
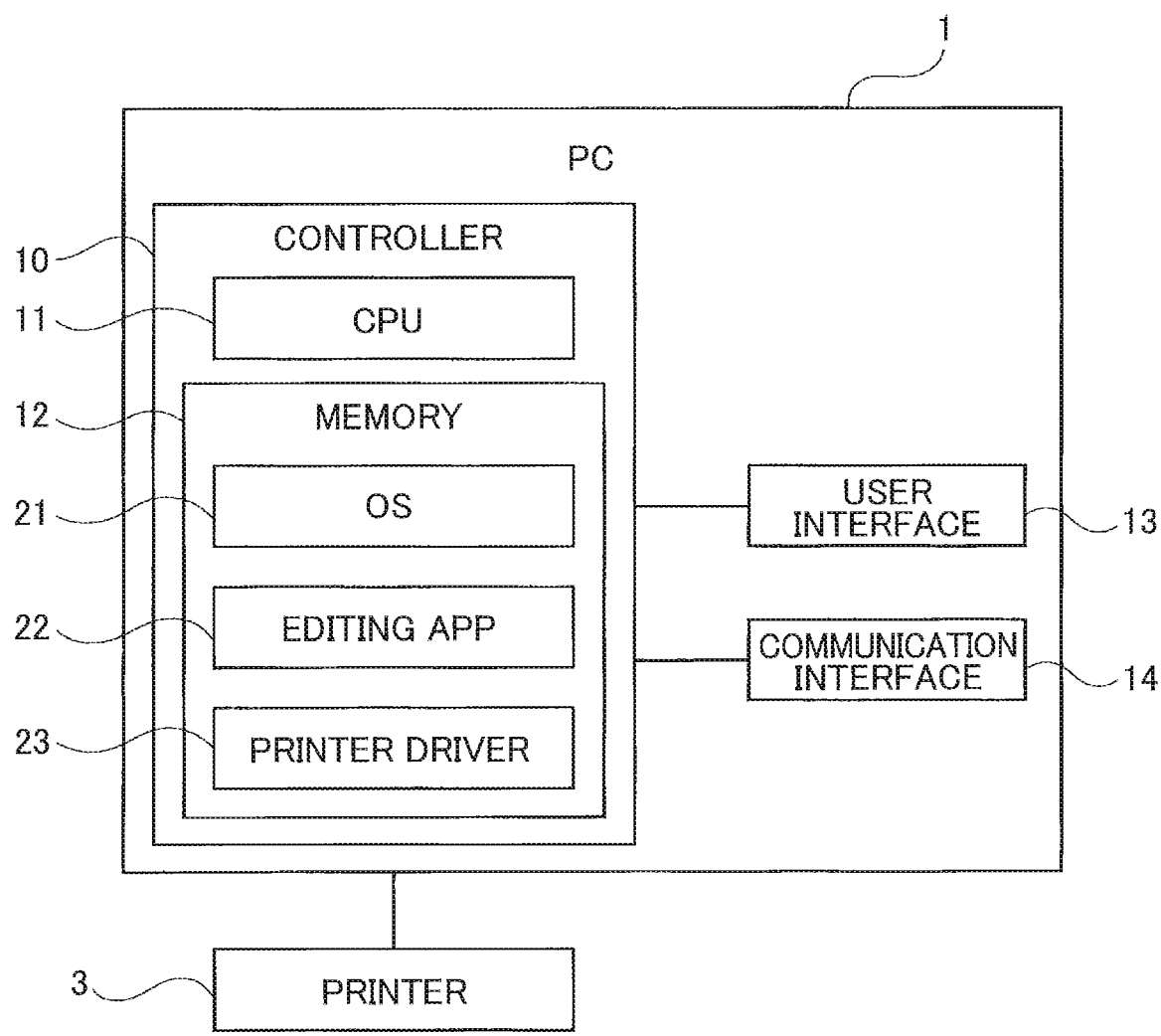
FIG. 1 is a block diagram illustrating an electrical configuration of a personal computer according to one embodiment of the present disclosure.

As illustrated in FIG. 1, the PC 1 in the present embodiment is provided with a controller 10 that includes a central processing unit (hereinafter referred to as "CPU") 11 and a memory 12. The PC 1 is one example of the information processing device of the present disclosure, and the CPU 11 is one example of the computer of the present disclosure. The PC 1 is also provided with a user interface 13 and a communication interface 14, both of which are electrically connected to the controller 10. Note that the controller 10 in FIG. 1 is a general concept that covers all hardware and software used for controlling the PC 1 and is not actually limited to representing a single piece of hardware present in the PC 1.

The CPU 11 executes various processes according to programs read from the memory 12 and based on user operations. The memory 12 stores various programs and various data and is also used as a work area when the CPU 11 executes various processes. A buffer provided in the CPU 11 is also one example of the memory of the present disclosure. Examples of the memory 12 may be a ROM, a RAM, a hard disk drive, or the like built into the PC 1 or may be any storage medium that is readable and writable by the CPU 11, such as a CD-ROM or a DVD-ROM.

The user interface 13 includes hardware that displays screens for reporting information to the user, and hardware that receives user operations. The user interface 13 may be a set of devices including a display capable of displaying information and a mouse, keyboard, and the like with input-receiving functions. Alternatively, the user interface 13 may be a touchscreen provided with both a display function and an input-receiving function.

The communication interface 14 includes hardware for communicating with an external device such as a printer 3. The communication standard employed by the communication interface 14 may be Ethernet (registered trademark), Wi-Fi (registered trademark), Universal Serial Bus (abbreviated as "USB"), or the like. "Ethernet" is a Japanese registered trademark of FUJIFILM Business Innovation Corp. "Wi-Fi" is a Japanese registered trademark of Wi-Fi Alliance. Alternatively, the PC 1 may be provided with a plurality of communication interfaces 14 supporting a plurality of communication standards.

As shown in FIG. 1, the memory 12 of the PC 1 stores an operating system (hereinafter referred to as "OS") 21, an editing application program (hereinafter referred to as "editing app") 22, and a printer driver 23. The printer driver 23 is one example of the computer-readable instructions of the present disclosure. The OS 21 may be one of Windows (registered trademark), macOS (registered trademark), Linux (registered trademark), iOS (registered trademark), and Android (registered trademark). "Windows" is a Japanese registered trademark of Microsoft Corporation. "macOS" is a Japanese registered trademark of Apple Inc. "Linux" is a Japanese registered trademark of Linus Torvalds. "iOS" is a Japanese registered trademark of Cisco Technology Inc. "Android is a Japanese registered trademark of Google Inc.

The editing app 22 is a program that accepts instructions for creating, editing, printing, and saving images and documents, for example. Examples of the editing app 22 include Microsoft Word (registered trademark) and Microsoft PowerPoint (registered trademark) developed by Microsoft Corporation (registered trademark), and an app developed by the vendor of the printer 3. "Microsoft," "Word," and "PowerPoint" are Japanese registered trademarks of Microsoft Corporation. The editing app 22 accepts user operations including instructions for controlling the printer 3 to perform prescribed operations. Specifically, the editing app 22 accepts instructions via the user interface 13, such as a designation of a device to be used for printing, a designation of an image to be printed, an instruction to edit print settings, and an instruction to execute a print, for example. The editing app 22 may also be capable of accepting such print settings as specifications for sheet type and size, a specification for the number of copies to be printed, and a specification for duplex printing.

The printer driver 23 is a program that supports the model of the printer 3 and communicates with the printer 3 to control the operations of the same. The printer driver 23 is started when the editing app 22 or the like receives an instruction to execute a print (print execution instruction) or an instruction to edit advanced print settings while the printer 3 is designated in the editing app 22. When the printer driver 23 receives a print job based on the print execution instruction received by the editing app 22 or the like, the printer driver 23 generates print data based on image data specified in the print job.

The printer 3 in the present embodiment is a device possessing at least a printing function for printing images on sheets of a printing medium, and a communication function for communicating with the PC 1. As illustrated in the example of FIG. 2, the printer 3 is provided with a print unit 31 that includes a print head (not illustrated) for forming images on sheets, a sheet-feeding tray 32 that accommodates the sheets prior to printing, a discharge tray 33 in which the printed sheets are received, a conveying mechanism 34 for conveying sheets, and a cutter 35 for cutting sheets.

Figure 2:
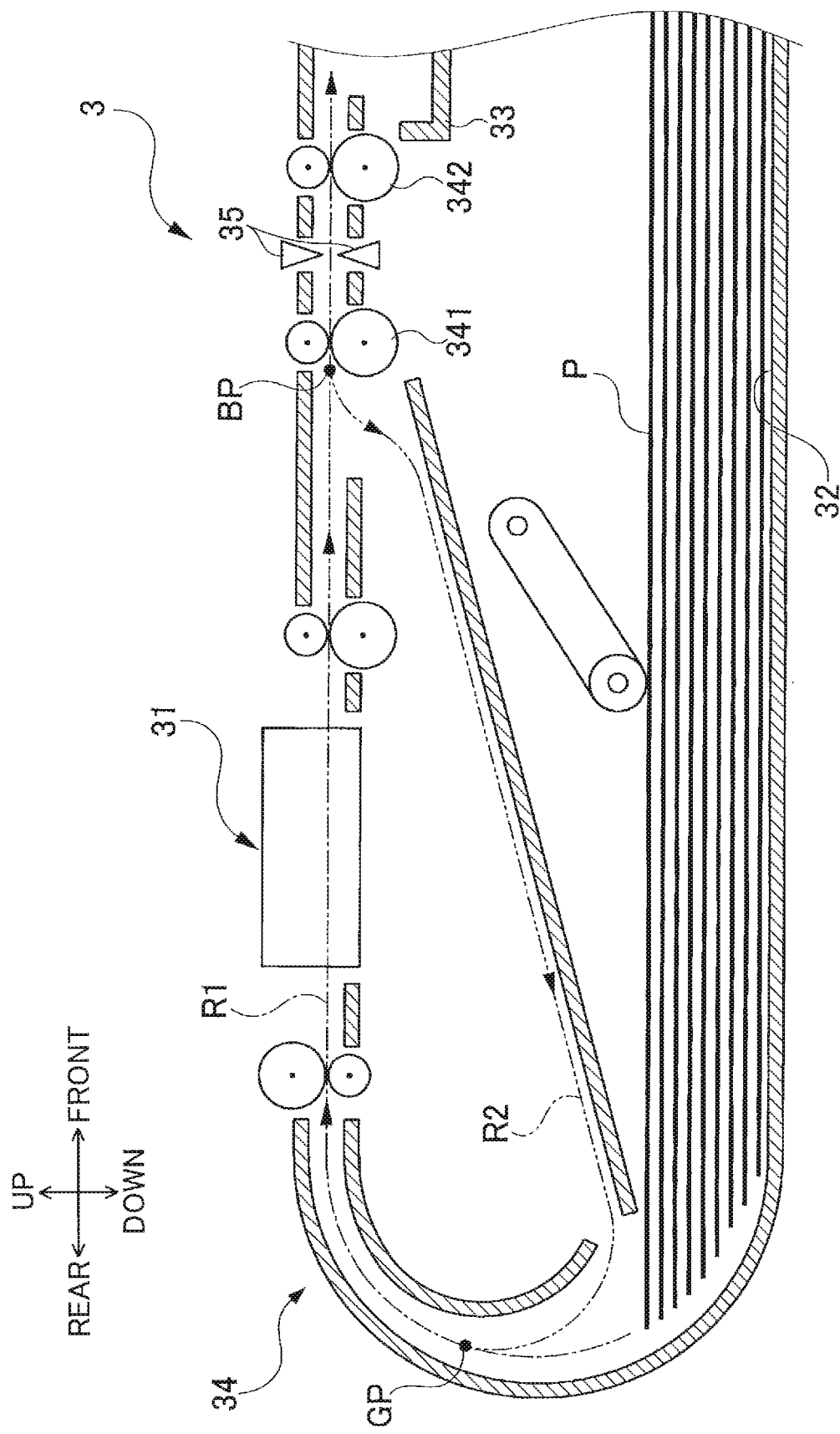
FIG. 2 is an explanatory diagram illustrating a schematic configuration of a printer.

When the printer 3 executes a print, the conveying mechanism 34 feeds one sheet P from the sheet-feeding tray 32 onto a conveying path R1 depicted with a one-dot chain line in FIG. 2 and conveys the sheet P to the print head of the print unit 31. The print head of the print unit 31 in the printer 3 is capable of performing inkjet printing, for example, by ejecting ink droplets downward in FIG. 2 in order to form an image on the top surface of the opposing sheet. The printer 3 continues to convey the sheet P while printing the same and discharges the sheet P into the discharge tray 33 face up, i.e., with the printed surface facing upward in the drawing. Here, the printing method of the print head of the print unit 31 is not limited to the inkjet method, but may be the electrophotographic method, the thermal transfer method, or the like. In the present embodiment, the printer 3 may be capable of performing color printing or monochrome printing only.

The printer 3 in the present embodiment is also capable of executing duplex printing. When performing duplex printing, the printer 3 first completes a print on one side of the sheet and subsequently halts conveyance of the sheet, pulling the sheet back into the printer 3 before the sheet is discharged into the discharge tray 33. At this time, the printer 3 conveys the sheet back to the print head of the print unit 31 while inverting the sheet so that the back surface now opposes the print head of the print unit 31 and the trailing edge is now the leading edge of the sheet. Specifically, after printing is completed on one side of the sheet and the trailing edge of the sheet in the conveying direction arrives at a branching position BP, the printer 3 controls the print head 31 to temporarily halt conveyance and subsequently to reverse the conveying direction so that the sheet is drawn onto a conveying path R2 depicted with a two-dot chain line in FIG. 2. The conveying path R2 merges with the conveying path R1 at a merging point GP upstream of the print head of the print unit 31 in the conveying direction. The sheet enters the conveying path R1 at the merging point GP and is conveyed back to the print head of the print unit 31 with the unprinted side facing upward to oppose the print head of the print unit 31. After both sides of the sheet have been printed, the printer 3 discharges the sheet into the discharge tray 33 so that the surface printed last is face up.

As illustrated in FIG. 2, the printer 3 of the present embodiment is further provided with conveying rollers 341 and 342. The cutter 35 is disposed between the conveying rollers 341 and 342 in the conveying direction of the sheet. The cutter 35 is provided with a pair of upper and lower blades, and a carriage for moving the blades. The carriage can move both blades in a direction parallel to the axial direction of the conveying roller 342, i.e., orthogonal to the conveying direction of the sheet in the printer 3, while the blades are in close proximity to each other. The conveying roller 342 is the roller in the conveying mechanism 34 disposed nearest the discharge tray 33. The conveying direction of the sheet in the printer 3 is one example of the first direction of the present disclosure.

With the cutter 35, the printer 3 has a cutting function for dividing a printed sheet in the conveying direction into a front portion and a rear portion prior to discharging the sheet. Specifically, the printer 3 can acquire information on the leading edge and trailing edge positions of the sheet in the conveying direction based on detection results of a paper sensor or the like, halt conveyance of the sheet when the sheet has been conveyed to a prescribed position based on this acquired information, and drive the cutter 35 to cut the sheet at a prescribed position. As a result, the sheet is divided in the conveying direction into front and rear portions prior to discharge. As an alternative, the cutter 35 may be configured with only one of the upper and lower blades or may be configured with a blade extending along the width direction of the sheet, and a carriage for moving the blade up and down.

One of the print settings that the printer driver 23 can receive in the present embodiment is a cut print setting. The cut print setting in the present embodiment sets a printing mode for printing an A4-size sheet and subsequently dividing the sheet at a center position of the longitudinal direction. When a print instruction that includes a cut print setting is received, the printer driver 23 transmits print data for an A4-size image and a cutting instruction for cutting the sheet to the printer 3. In the present embodiment, the printer driver 23 accepts a cut print setting that combines printing of an A4-size sheet with a cutting instruction but does not accept an instruction to cut sheets of sizes other than the A4 size. However, the printer driver 23 may accept a setting for cutting sheets of sizes other than the A4 size, provided that the sheet size is supported by the cutting function of the printer 3.

When the printer 3 receives print data and a cutting instruction, the printer 3 conveys an A4-size sheet with the longitudinal dimension aligned in the conveying direction, prints an image on the sheet based on the print data, and cuts the sheet in half at the longitudinal center position, thereby obtaining two printed sheets of A5 size. A4 size is one example of the first size of the present disclosure, and A5 size is one example of the second size of the present disclosure. Thereafter, the printer 3 resumes conveyance of the cut sheets, discharging the front sheet in the conveying direction into the discharge tray 33 first, and subsequently discharging the rear sheet on top of the front sheet.

The position at which the sheet is cut by the cutter 35 of the printer 3 may deviate from the correct position due to such factors as conveyance irregularities and misalignment of the blade driving position. The margin of cutting error on the printer 3 of the present embodiment is 3 mm. This error margin is the maximum deviation between the actual cutting position in the printer 3 and the set position. That is, the cutting position in the printer 3 of the present embodiment is within ±3 mm of the longitudinal center position on an A4-size sheet.

Next, the steps in various printing-related processes executed on the PC 1 on which the editing app 22 and the printer driver 23 are installed will be described with reference to the sequence diagram in FIG. 3 and various flowcharts. Note that the processes performed on the PC 1 and each step in the flowcharts described below is essentially a process performed by the CPU 11 according to instructions described in the printer driver 23 and other programs.

Figure 3:
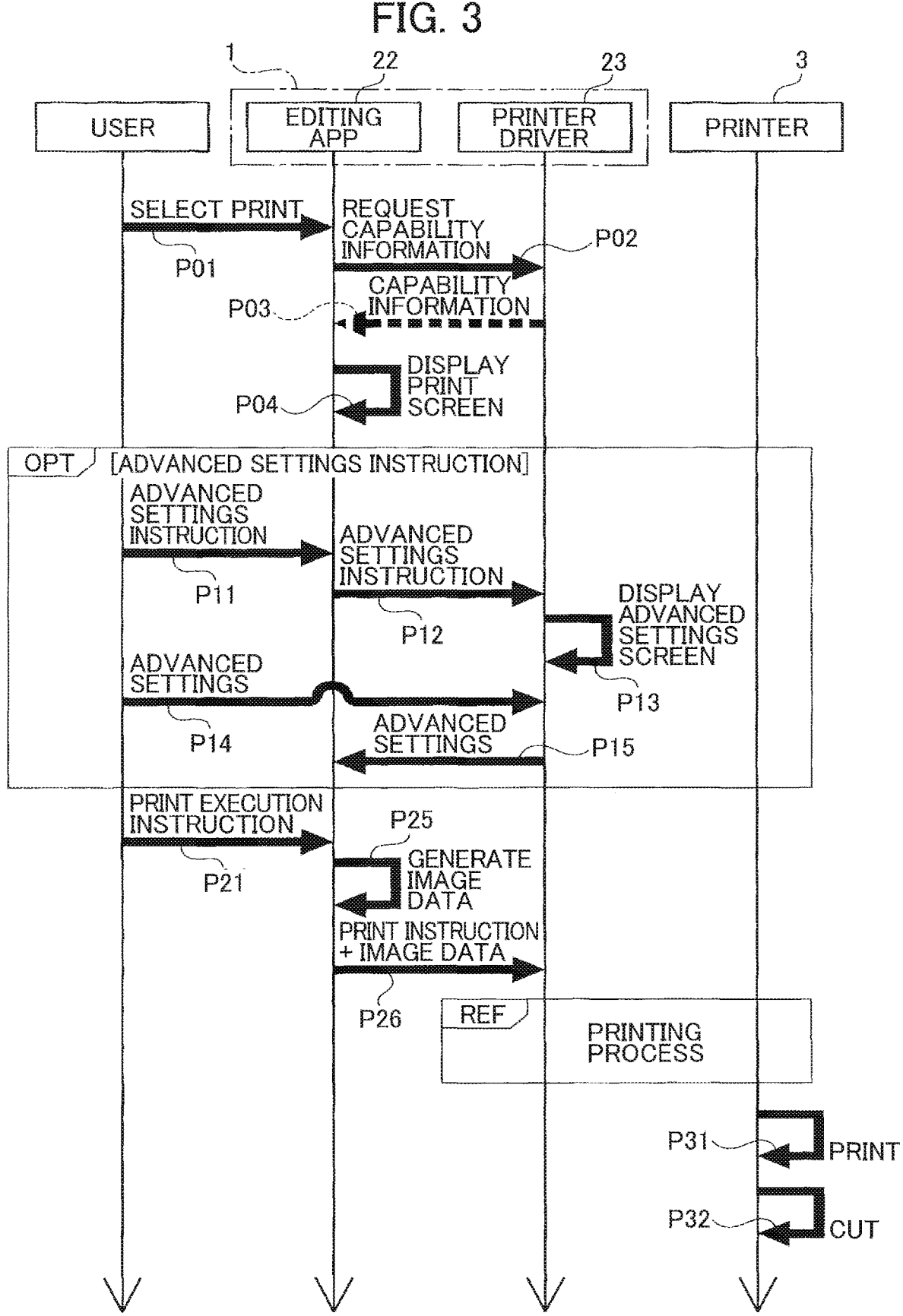
FIG. 3 is a sequence diagram illustrating steps showing operations caused by programs in relation to printing.

As illustrated in FIG. 3, in P01 the user executes the editing app 22 and selects Print while the document or image to be printed is selected in the editing app 22. When the editing app 22 receives a printing-related instruction while the printer 3 is currently selected as the printing device, in P02 the editing app 22 starts up the printer driver 23 corresponding to the printer 3 and requests information on the capabilities of the printer 3 from the printer driver 23. The printer driver 23 receives the request in P02 via the OS 21, for example.

In response to this request, the printer driver 23 transfers capability information on the capabilities of the printer 3 to the editing app 22 in P03. The capability information includes information related to selectable print settings, such as information on selectable paper sizes and printing resolutions. In the present embodiment, the printer driver 23 returns the capability information including information on special sizes associated with cut print settings as selectable paper sizes. The printer driver 23 may also acquire and save information on the capabilities of the printer 3 in advance or may acquire this information by requesting the information from the printer 3 or the like in response to a request from the editing app 22.

In P04 the editing app 22 displays a print screen based on the information received from the printer driver 23 and accepts instructions for general (basic) print settings. The print screen accepts specifications for general (basic) print settings including a paper size selection, an instruction to edit advanced print settings, an instruction to execute a print, and the like. When the editing app 22 receives an instruction for selecting a paper size in the print screen, for example, the editing app 22 displays a list of options for selectable paper sizes in the print screen based on the capability information received from the printer driver 23. Since the paper sizes returned from the printer driver 23 in the capability information include special sizes, the special sizes are included in the paper size options displayed by the editing app 22. The paper sizes will be described later in greater detail.

The editing app 22 can receive an instruction in the displayed print screen to edit advanced print settings (opt: [advanced settings instruction]). When the editing app 22 receives an instruction to edit advanced print settings in P11, in P12 the editing app 22 transfers information on print settings currently selected in the print screen and information indicating an instruction to edit advanced print settings to the printer driver 23.

Figure 4:
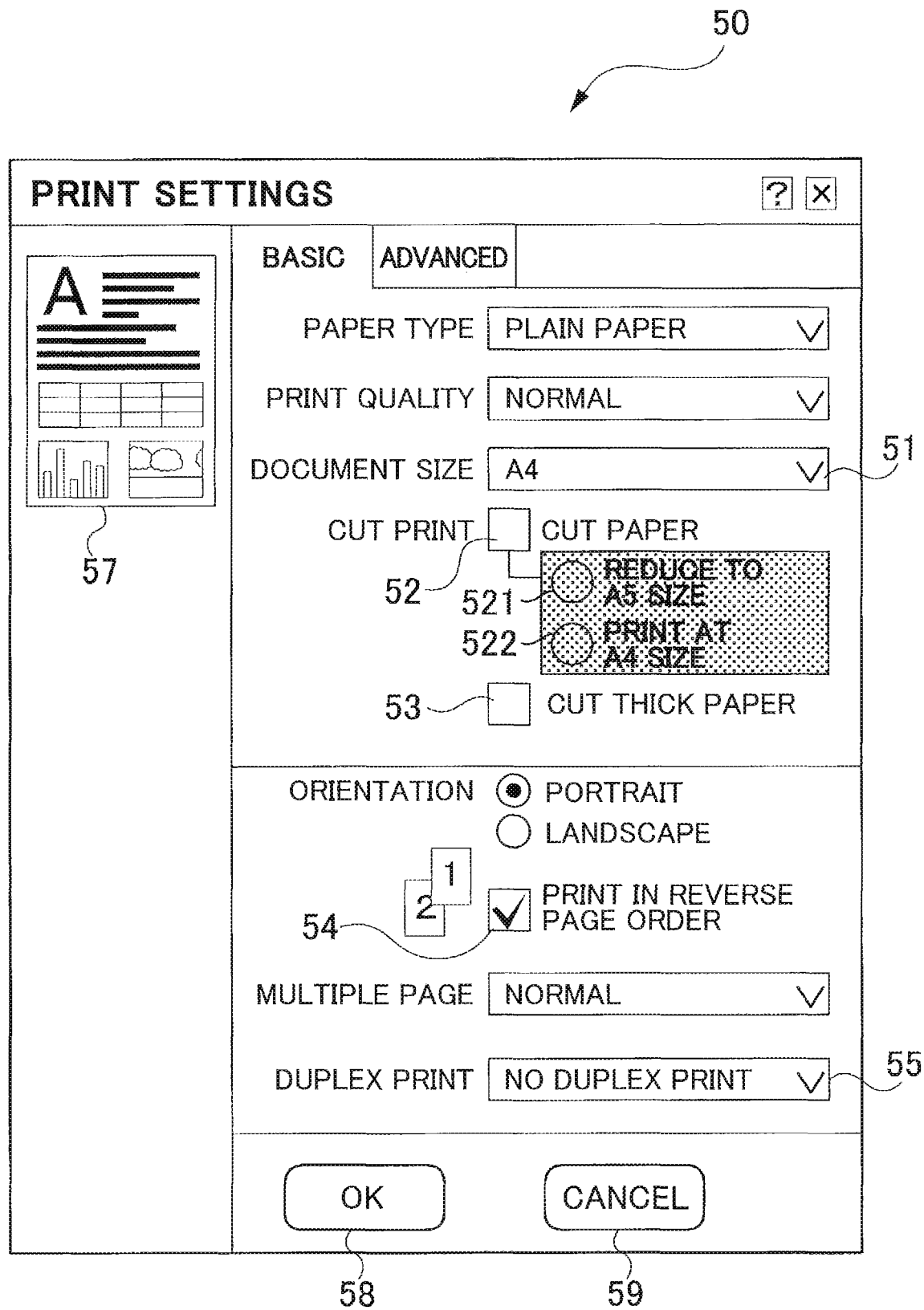
FIG. 4 is an explanatory diagram illustrating one example of a settings screen.

Based on the instruction received from the editing app 22, in P13 the printer driver 23 displays a settings screen on the user interface 13 for accepting operations to edit advanced print settings (advanced settings screen) and in P14 receives editing instructions for advanced print settings based on user operations. FIG. 4 illustrates a sample settings screen 50 that the printer driver 23 displays on the user interface 13 to receive user operations.

The settings screen 50 shown in FIG. 4 includes a document size selection field 51, a checkbox 52 for receiving a cut print setting, a checkbox 53 for receiving a thick paper cut setting, a checkbox 54 for receiving a reverse order print setting, a duplex print selection field 55, a sample image 57 showing a preview of the printed image, an OK button 58, and a Cancel button 59. The settings screen 50 may accept other settings in addition to the items described above, such as settings for paper type, printing quality, color or monochrome printing, and number of copies.

The document size selected in the document size selection field 51 is information specifying the size of image to be printed. When an instruction to execute a print is received, the editing app 22 generates image data based on the size of the image being printed.

The checkbox 52 is information indicating whether to include a cut print setting in the print settings. The process of receiving a cut print setting through an operation in the checkbox 52 is one example of the setting process of the present disclosure. Note that the printer driver 23 can only accept a cut print setting through a check in the checkbox 52 when "A4" or "A5" is selected as the document size. The printer driver 23 will not accept an operation in the checkbox 52 when the document size is not one of "A4" and "A5". The thick paper cut setting according to a check in the checkbox 53 is information indicating that the sheet being cut is a hard-to-cut sheet, such as thick or glossy paper.

When the printer driver 23 receives an operation for inserting a check into the checkbox 52 while "A4" is currently selected as the document size, the printer driver 23 can further receive a mutually exclusive selection from among "Reduce to A5 size" and "Print at A4 size" through corresponding radio buttons 521 and 522. The radio buttons 521 and 522 are grayed out and do not accept selections when "A5" is selected as the document size when an operation to check the checkbox 52 is received or while the checkbox 52 remains unchecked.

The printer driver 23 in the present embodiment supports the following three modes as cut print settings. The first mode is a combination of the document size "A4", a check in the checkbox 52, and a selection of "Reduce to A5 size" through the radio button 521, whereby A4-size images are reduced to A5 size, two A5-size pages are printed side-by-side on one A4-size sheet, and the printed sheet is subsequently cut in half. When print instructions for this setting are received, the printer 3 creates two A5-sheets, each of which has a reduced image of original image data printed thereon. Hereinafter, this setting combination will be called the "A4 reduce and cut setting."

The second mode is a combination of the document size "A4", a check in the checkbox 52, and a selection of "Print at A4 size" through the radio button 522, whereby each non-reduced A4-size image is printed on one A4-size sheet and the printed sheet is cut in half. When print instructions for this setting are received, the printer 3 creates an A5-size sheet on which the top half of the page is printed and another A5-size sheet on which the bottom half is printed based on the original image data. Hereinafter, this setting combination will be called the "A4 cut setting."

The third mode is a combination of the document size "A5" and a check in the checkbox 52, whereby two pages worth of A5-size images are printed side-by-side on one A4-size sheet, and the printed sheet is cut in half. When print instructions for this setting are received, the printer 3 creates two A5-size sheets, each of which has a single page of the original image data printed thereon. Hereinafter, this setting combination will be called the "A5 cut setting."

The checkbox 54 is information specifying whether the page order of the image data is the normal or reverse order. When the editing app 22 receives an instruction to execute a print while the reverse order is indicated through a check in the checkbox 54, the editing app 22 outputs the image data for each page in reverse order to the page order at the time of editing. Since the printer 3 discharges printed sheets face up, as described above, the first page is discharged first and stacked on the bottom when the normal printing order is selected with single-sided printing. However, when the reverse printing order is selected with single-sided printing, the first page is discharged last and stacked on the top.

Through a specification in the duplex print selection field 55, the printer driver 23 receives one of the following selections: "No duplex print," "Duplex print with long-edge binding," and "Duplex print with short-edge binding." The process of accepting a duplex print setting through an operation in the duplex print selection field 55 is one example of the duplex setting process of the present disclosure. In the present embodiment, the printer driver 23 does not accept instructions for both duplex printing and reverse order. Thus, reverse order printing is turned off when a duplex print instruction is received, and the duplex printing option is turned off when a reverse order instruction is received.

Figure 5A:
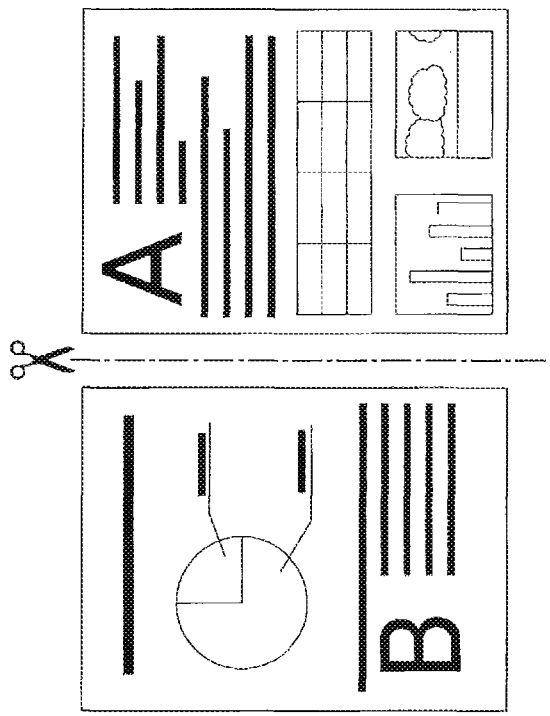
FIGS. 5A and 5B are explanatory diagrams each of which illustrates one example of a sample image showing an image of printed matter.
Figure 5B:
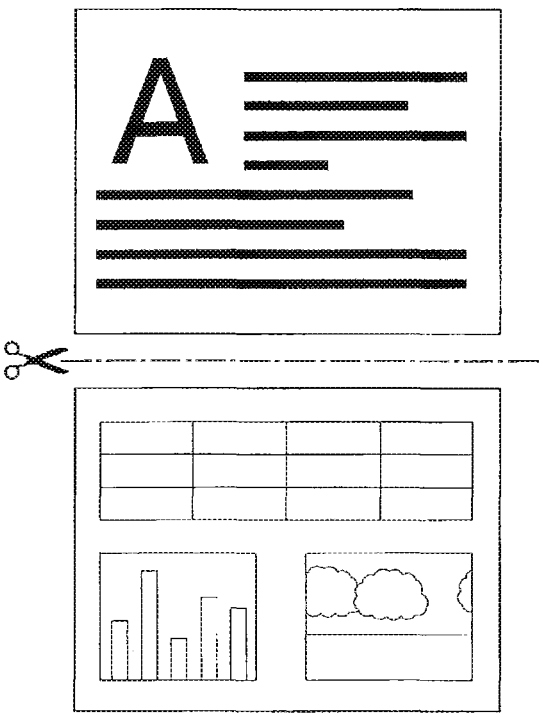

An image corresponding to the settings selected in the settings screen 50 is displayed as the sample image 57. When a cut print setting is currently selected, for example, an image of printed matter cut into two pages is displayed as the sample image 57, as illustrated in FIGS. 5A and 5B. When the selected cut print setting is the A4 reduce and cut setting or the A5 cut setting, the sample image 57 shows two pages of images and a cutting image, as illustrated in FIG. 5A. When the A4 setting is selected, the sample image 57 shows an image of one page and a cutting image, as illustrated in FIG. 5B.

Figure 6:
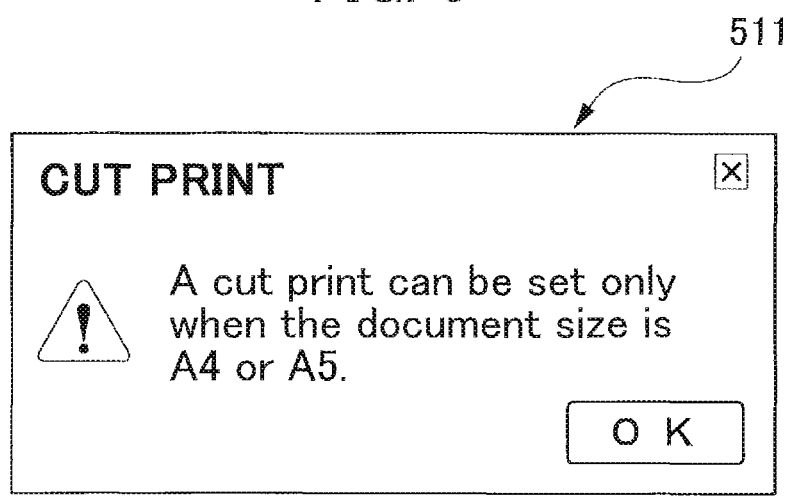
FIG. 6 is an explanatory diagram illustrating one example of a warning screen.

The printer driver 23 of the present embodiment is limited to the three modes of cut print settings described above. Hence, the printer driver 23 displays a warning screen when the user operates the document size selection field 51 to select a size other than the A4 or A5 size while a check is inserted in the checkbox 52. FIG. 6 illustrates an example of a warning screen 511. The warning screen 511 illustrated in FIG. 6 displays a message indicating that a cut print can be set only when the document size is A4 or A5. When the user closes the warning screen 511 by operating the OK button in the warning screen 511 or the like, the printer driver 23 turns off the cut print setting by displaying the settings screen 50 with the checkbox 52 unchecked. The process of displaying the warning screen 511 is an example of the warning process of the present disclosure. The printer driver 23 can avoid errors due to improper settings by displaying the warning screen when a document size incompatible with a cut print has been selected.

Returning to the description in FIG. 3, after the printer driver 23 displays the settings screen 50 in P13, steps P14 and P13 are repeated as the user performs operations in the settings screen 50 in P14 and the printer driver 23 modifies the display of the settings screen 50 in P13 based on the user operations received in P14, as long as the user operation is not an operation on the OK button 58 or the Cancel button 59. Once an operation on the OK button 58 or Cancel button 59 is received in P14, the printer driver 23 terminates the display of the settings screen 50 and in P15 transfers information on the advanced print settings to the editing app 22.

Thus, the printer driver 23 and editing app 22 share the print settings information. When the printer driver 23 receives an operation on the OK button 58 in P14, in P15 the printer driver 23 outputs settings information to the editing app 22 specifying each of the print settings currently selected. The editing app 22 can input settings information outputted from the printer driver 23 in P15 and adjusts and redisplays the print screen originally displayed in P04 based on the inputted settings information. On the other hand, when an operation on the Cancel button 59 has been received in P14, the printer driver 23 discards all information on user operations received in the settings screen 50. In this case, in P15 the printer driver 23 may output the print settings information that has been set when the advanced settings instruction has been received in P12 or may output information indicating that print settings have not been changed. Further, the editing app 22 redisplays the print screen displayed in P04 with no changes.

The editing app 22 can also accept a paper size selection in the displayed print screen. When an instruction for selecting a paper size is received, the editing app 22 displays a list of selectable paper sizes as options. As described above, the capability information that the printer driver 23 transfers to the editing app 22 in P03 includes information on special sizes associated with cut print settings. Accordingly, the list of options displayed by the editing app 22 includes options for these special sizes.

Figure 7:
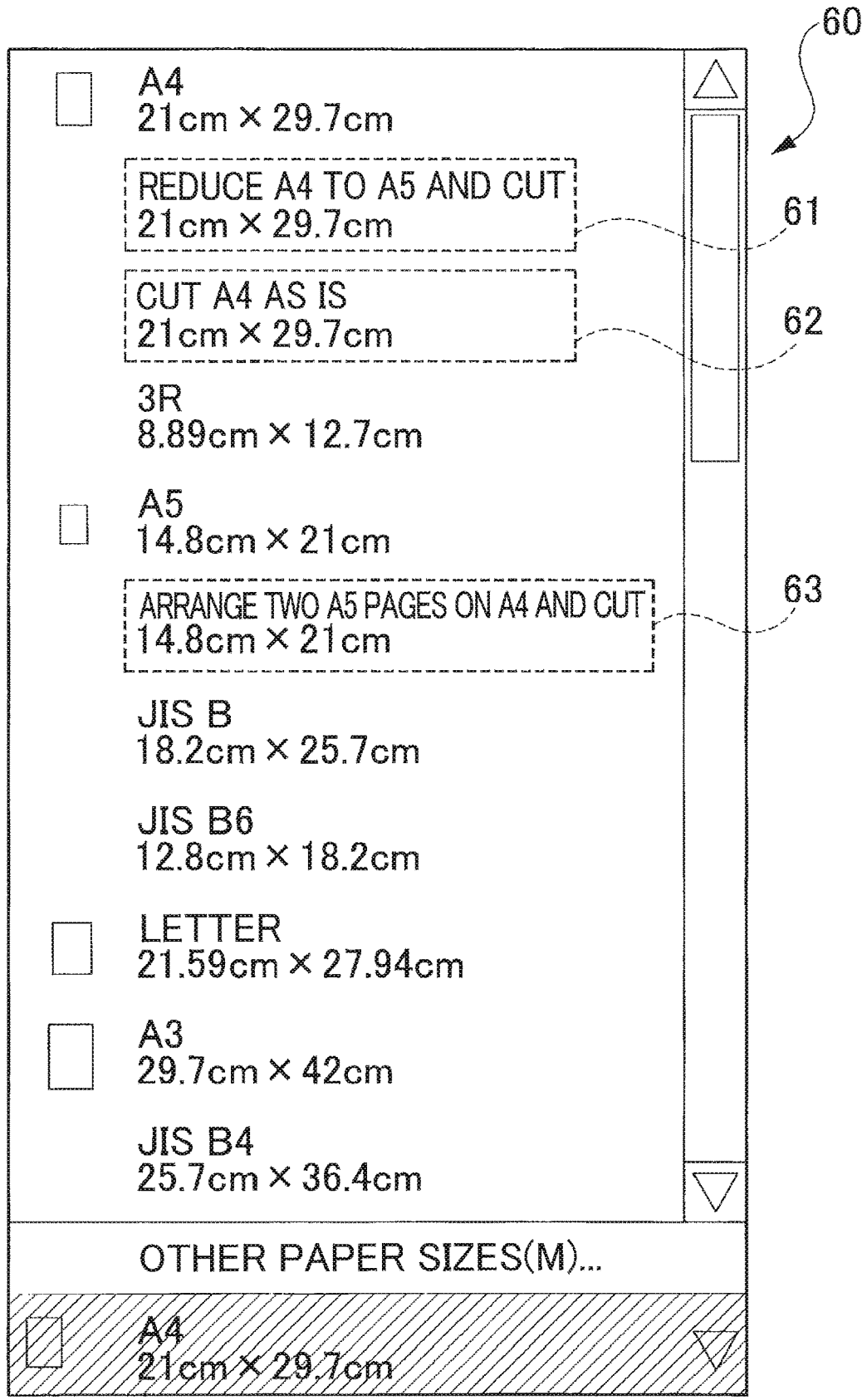
FIG. 7 is an explanatory diagram illustrating one example of a print screen.

FIG. 7 illustrates a sample list 60 of paper sizes displayed by the editing app 22. The list 60 illustrated in FIG. 7 includes three selections for special sizes: an option 61 specifying "Reduce A4 to A5 and cut"; an option 62 specifying "Cut A4 as is"; and an option 63 specifying "Arrange two A5 pages on A4 and cut". Option 61 corresponds to the A4 reduce and cut setting; option 62 corresponds to the A4 cut setting; and option 63 corresponds to the A5 cut setting. Flexibility of cut print settings is enhanced by displaying and accepting selections for the plurality of options for different cut print settings.

Upon receiving an instruction to edit advanced print settings or an instruction to execute a print, the editing app 22 transfers information on the currently selected print settings to the printer driver 23. When one of the options 61 through 63 is selected as the paper size in the currently displayed print screen, the editing app 22 transfers information specifying this option to the printer driver 23. The process of accepting a cut print setting through a selection of one of the options 61 through 63 is one example of the setting process of the present disclosure.

When the print settings information received from the editing app 22 with an instruction for editing advanced print settings includes information indicating that one of the options 61 through 63 has been selected as the paper size, the printer driver 23 displays the settings screen 50 with the corresponding cut print setting in a selected state. Specifically, the printer driver 23 inserts a check into the checkbox 52 and modifies the selected states of the document size selection field 51 and radio buttons 521 and 522 according to the option information received from the editing app 22 as the paper size. Thus, the user can identify the cut print setting in the displayed settings screen 50.

In the present embodiment, the settings screen 50 displayed by the printer driver 23 does not include the special sizes as selectable options in the document size selection field 51. When the special sizes were displayed in the settings screen 50, changing the displayed content would become complicated and could confuse the user. The printer driver 23 of the present embodiment avoids user confusion by not displaying the special sizes in the document size selection field 51 and, hence, not accepting special size selections.

On the other hand, when the paper size information received from the editing app 22 is a selection other than options 61 through 63, the printer driver 23 displays the size corresponding to the received paper size information in the document size selection field 51. Further, when the paper size information received from the editing app 22 indicates "A4" or "A5", the printer driver 23 does not change the checked state of the checkbox 52 in the settings screen 50 from a previous setting or default setting. When the paper size information received from the editing app 22 indicates a size other than "A4" or "A5", the printer driver 23 unchecks the checkbox 52 when displaying the settings screen 50.

Further, when the printer driver 23 receives a cut print setting in the settings screen 50, in P15 of FIG. 3 the printer driver 23 transfers information specifying the corresponding option among the options 61 through 63 to the editing app 22 as paper size information rather than transmitting the size information received in the document size selection field 51. For example, when values related to cut print settings among the print settings selected in the settings screen 50 match values associated with one of the options 61 through 63, the printer driver 23 outputs information specifying this option. The editing app 22 can display information indicating that a special size has been selected based on the inputted information, enabling the user to identify through the editing app 22 that a cut print has been set.

On the other hand, when a cut print setting has not been received, the printer driver 23 transmits the size information received in the document size selection field 51 to the editing app 22 as information on the selected paper size.

When the editing app 22 receives an instruction for selecting a paper size after receiving paper size information from the printer driver 23, the editing app 22 displays the list 60 with the corresponding option in a selected state based on the information received from the printer driver 23. When receiving an instruction to execute a print while option 61 or 62 is selected, the editing app 22 generates image data assuming that the size of the images being printed is the A4 size. Further, when receiving an instruction to execute a print while option 63 is selected, the editing app 22 generates image data assuming that the size of the images being printed is the A5 size. If an instruction to execute a print is received when a paper size other than the options 61 through 63 is selected, the editing app 22 generates image data assuming that the size of the images being printed is the selected paper size.

As an alternative, the information on print settings may be written to a memory area shared by the editing app 22 and printer driver 23. That is, the editing app 22 and printer driver 23 can share information by reading print settings information from the same memory area and writing printing settings information to the same memory area. In this case, the printer driver 23 may write advanced settings information to the shared memory area in P15 of FIG. 3.

Returning to the description of FIG. 3, when the editing app 22 receives an instruction to execute a print (print execution instruction) in the displayed print screen in P21, in P25 the editing app 22 generates image data for the images being printed based on the print settings and in P26 transfers a print instruction and the image data to the printer driver 23. Here, the print instruction may include the print settings information.

The printer driver 23 executes a printing process based on the information received from the editing app 22 (ref). In the printing process, the printer driver 23 generates print data based on the image data and transmits the generated print data and a print command to the printer 3, directing the printer 3 to execute a print based on the print data. Steps in this printing process will be described next with reference to the flowchart in FIG. 8. The CPU 11 of the PC 1 executes the printing process based on the printer driver 23.

Figure 8:
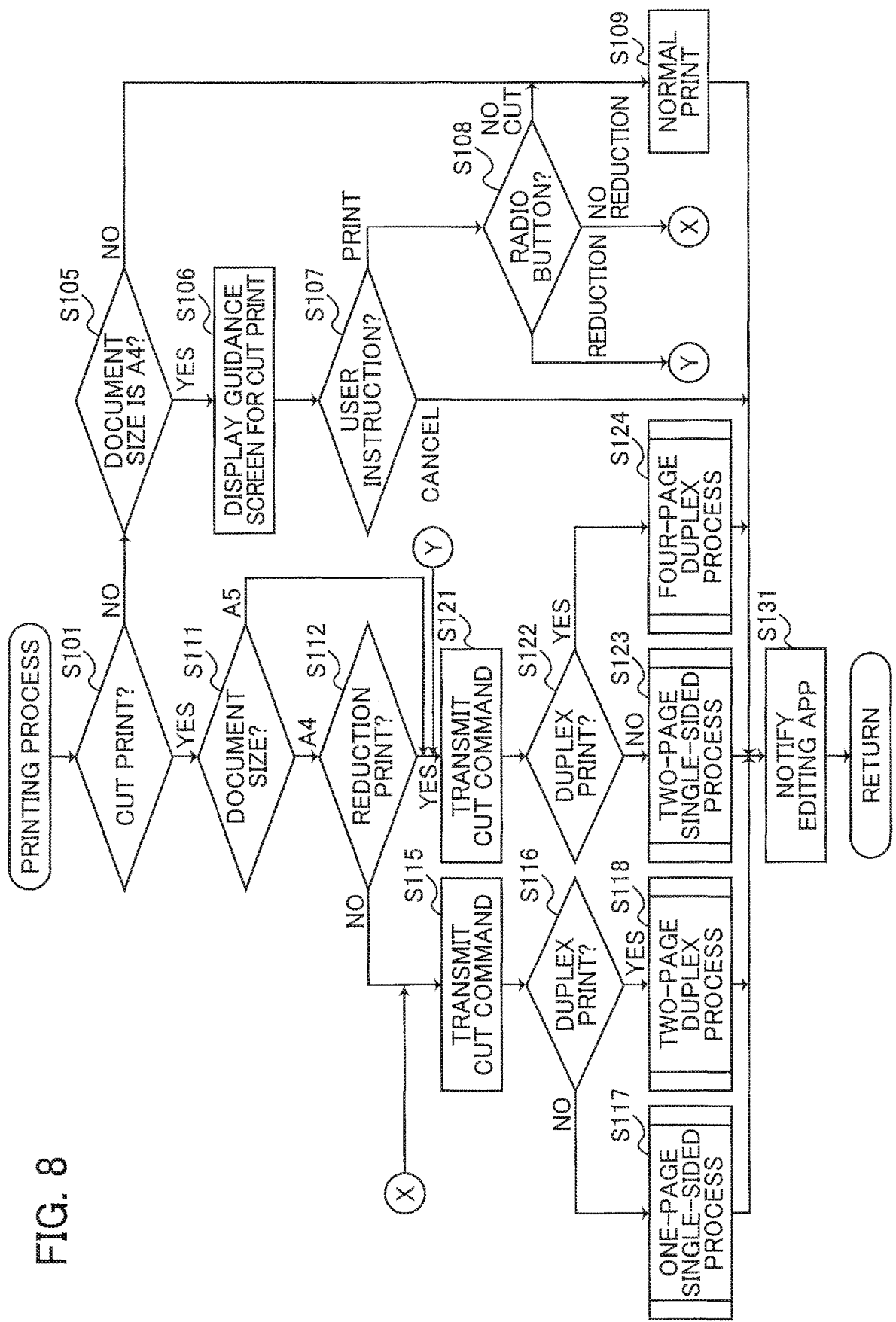
FIG. 8 is a flowchart illustrating steps in a printing process.

In S101 at the beginning of the printing process in FIG. 8, the CPU 11 determines whether a cut print has been set in the print settings. When the CPU 11 determines that a cut print has not been set (S101: NO), in S105 the CPU 11 determines whether the A4 size has been designated as the document size in the print settings. When the A4 size has been designated (S105: YES), in S106 the CPU 11 displays a guidance screen on the user interface 13 to inform the user that a cut print can be selected. Since the printer driver 23 of the present embodiment instructs the user that a cut print can be selected when the document size is the A4 size, the printer driver 23 encourages the use of cut prints, increasing the likelihood that the user will recognize and use a cut print. This can be expected to lead to savings in paper and consumables.

Figure 9:
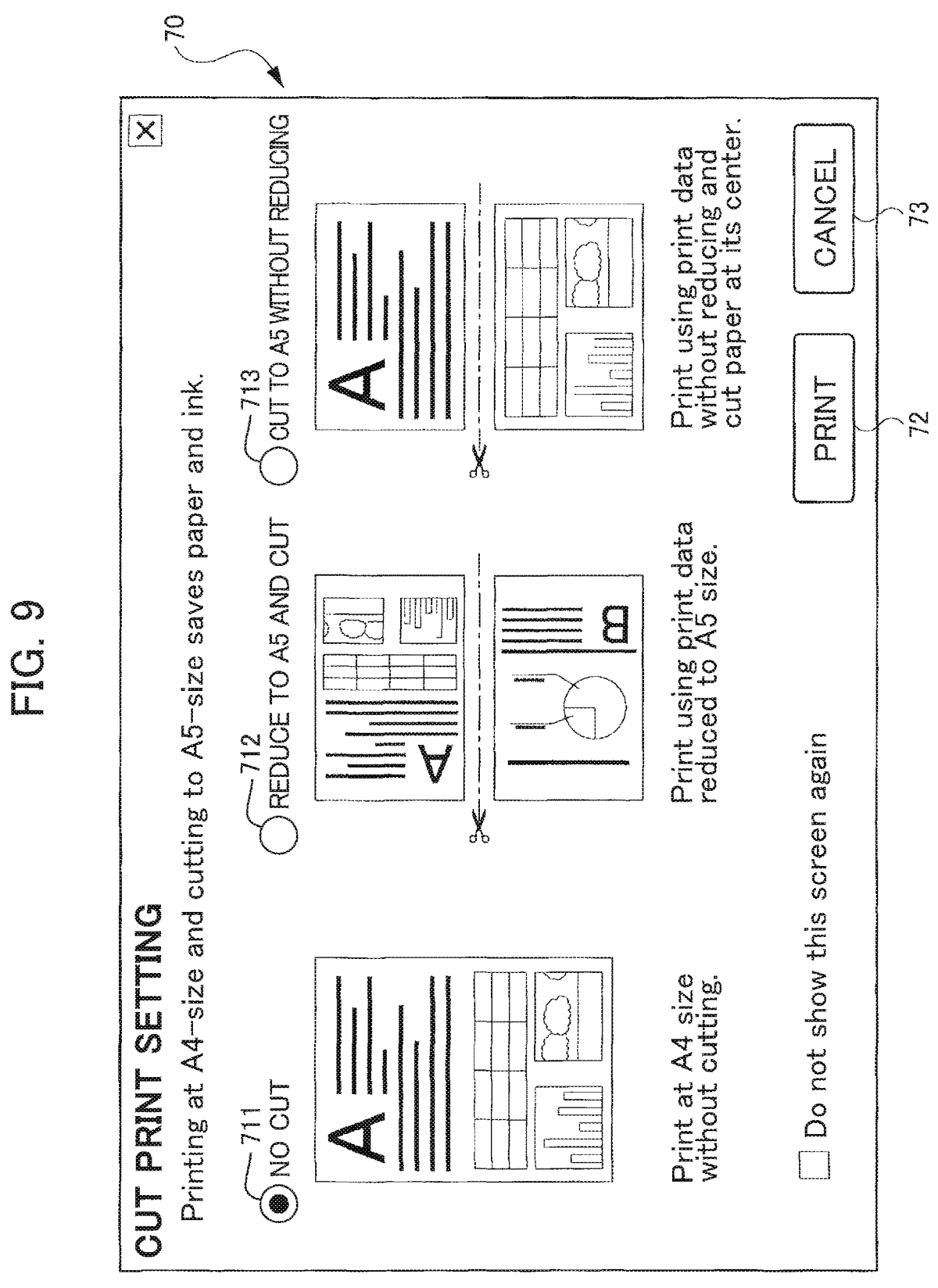

FIG. 9 illustrates a sample guidance screen 70. The guidance screen 70 illustrated in FIG. 9 includes radio buttons 711, 712, and 713 that accept one mutually exclusive choice; sample images for printed matter corresponding to each radio button selection; a Print button 72; and a Cancel button 73. The radio button 711 accepts a selection for "No cut" to indicate that a cut print is not set. The radio button 712 accepts a selection for "Reduce to A5 and cut" indicating the A4 reduce and cut setting. The radio button 713 accepts a selection for "Cut to A5 without reducing" indicating the A4 cut setting.

Next, in S107 the CPU 11 determines whether the Print button 72 or Cancel button 73 has been operated in the guidance screen 70. When the CPU 11 determines that an instruction to cancel printing has been received through the Cancel button 73 (S107: Cancel), in S131 the CPU 11 notifies the editing app 22 that the printing process has been completed and terminates the printing process without generating print data. Since the guidance screen 70 accepts an instruction to continue or cancel a print job, the user can determine whether or not to continue the print job based on the guidance given in the guidance screen 70.

When the CPU 11 determines that a selection to continue the printing process has been received through the Print button 72 (S107: Print), in S108 the CPU 11 determines whether the radio button 711 is selected. When the CPU 11 determines that the radio button 711 is selected (S108: No cut) or when the CPU 11 determines in S105 that the document size is not the A4 size (S105: NO), in S109 the CPU 11 generates print data and transmits the generated print data and a print command to direct the printer 3 to perform a normal print that does not include a cut print setting. Subsequently, in S131 the CPU 11 notifies the editing app 22 that the printing process is finished and ends the printing process. Cases in which one of the radio buttons 712 and 713 has been selected will be described later.

On the other hand, when the CPU 11 determines in S101 that a cut print has been set in the print settings (S101: YES), in S111 the CPU 11 determines whether the document size is the A4 size or the A5 size. When the CPU 11 determines that the document size is the A4 size (S111: A4), in S112 the CPU 11 determines whether the A4 reduce and cut setting is selected. The CPU 11 reaches a YES determination in S112 when the radio button 521 has been selected in the settings screen 50 (see FIG. 4) or when the option 61 has been selected as the paper size in the print screen (see FIG. 7).

When the CPU 11 determines that the A4 reduce and cut setting is not selected, i.e., that the A4 cut setting is selected (S112: NO) or when the CPU 11 determines in S108 that the Print button 72 is operated in the guidance screen 70 while the radio button 713 is selected (S108: No reduction), in S115 the CPU 11 transmits a cut command to the printer 3. This cut command is an instruction to cut all pages in the print job to be subsequently transmitted. Note that the cut command need not be applied to the entire print job but may be a cut instruction applied to individual pages. In the latter case, the CPU 11 assigns a cut instruction to each page and transmits these instructions when transmitting the print data, as described below.

In S116 the CPU 11 determines whether duplex print is selected in the print settings. When the CPU 11 determines that duplex print is not selected (S116: NO), in S117 the CPU 11 executes a one-page single-sided process. In the one-page single-sided process, the CPU 11 generates print data for printing an A4-size image of one page on one side of an A4-size sheet and transmits the generated print data to the printer 3.

Steps in the one-page single-sided process will be described next with reference to the flowchart in FIG. 10. In S201 at the beginning of this process, the CPU 11 allocates an area in the memory 12 of a predetermined size to create a print data area for pasting rasterized image data of an A4-size page to generate print data. In S202 the CPU 11 acquires one page worth of image data from the data generated by the editing app 22.

In S211 the CPU 11 executes a white-out process. In the white-out process, the CPU 11 generates print data in which the portion of the image likely to be contacted by the cutter 35 in the printer 3 is set to a white image for which no colorant is applied. When executing a print on an inkjet-type printer 3, for example, ink deposited on the sheet may not be completely dry immediately after printing. By forming a white image in the cutting area, the CPU 11 can prevent ink from adhering to the cutter 35, thereby preventing such ink from becoming deposited on sheets that are cut next and preventing rust from forming on the cutter 35.

Figure 11:
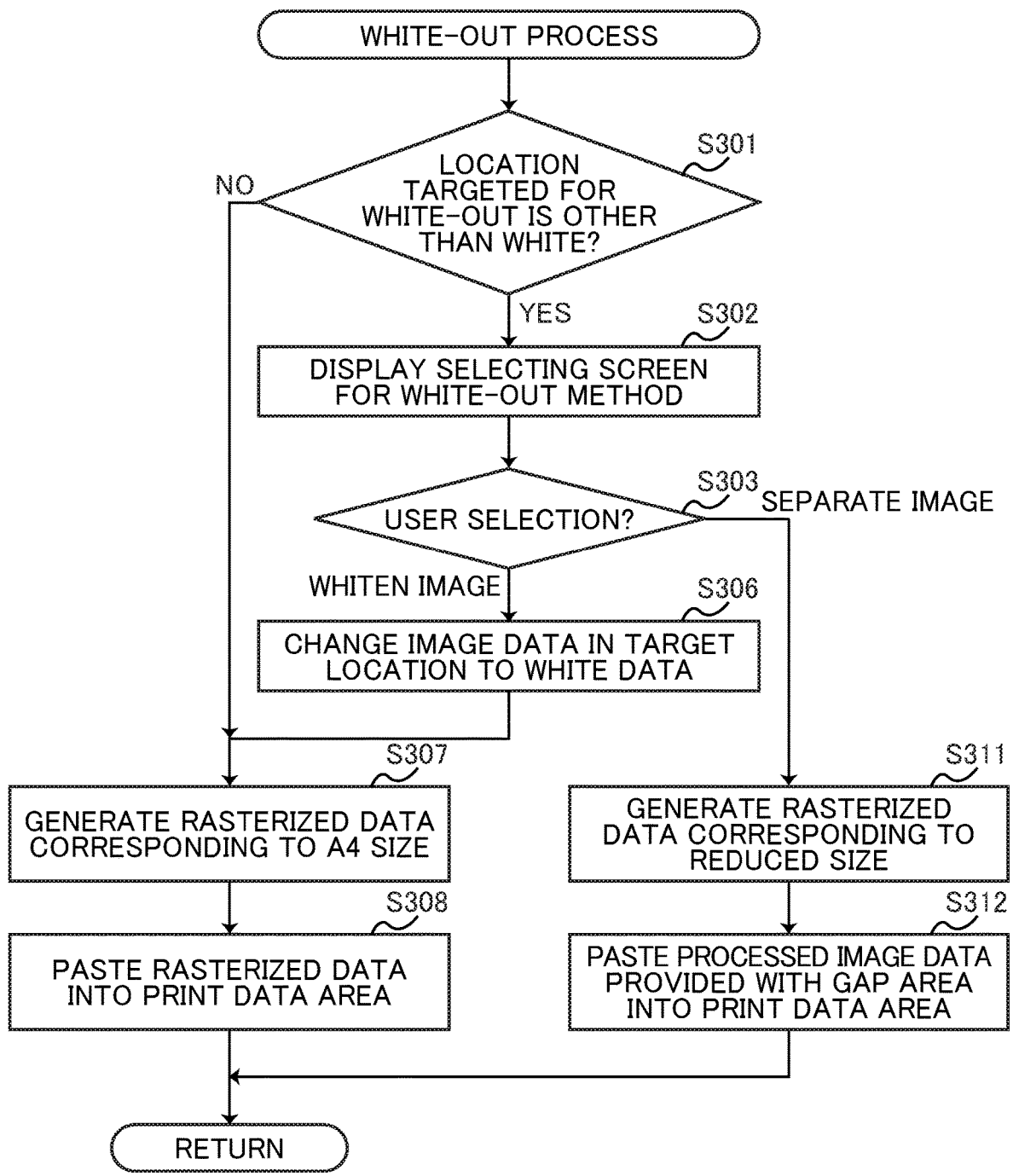
FIG. 11 is a flowchart illustrating steps in a white-out process.

Steps in the white-out process will be described next with reference to the flowchart in FIG. 11. In S301 of the white-out process, the CPU 11 determines whether the location targeted for white-out has drawing data in a color other than white. The location targeted for white-out is a range on the sheet that could be contacted by the cutter 35 during cutting when accounting for cutting error. For example, the location is a range of ±3 mm from the longitudinal center position on the sheet including the center position.

When the CPU 11 determines that the location targeted for white-out has drawing data in a color other than white (S301: YES), in S302 the CPU 11 displays a selection screen on the user interface 13 to accept a selection for the white-out method.

Figure 12:
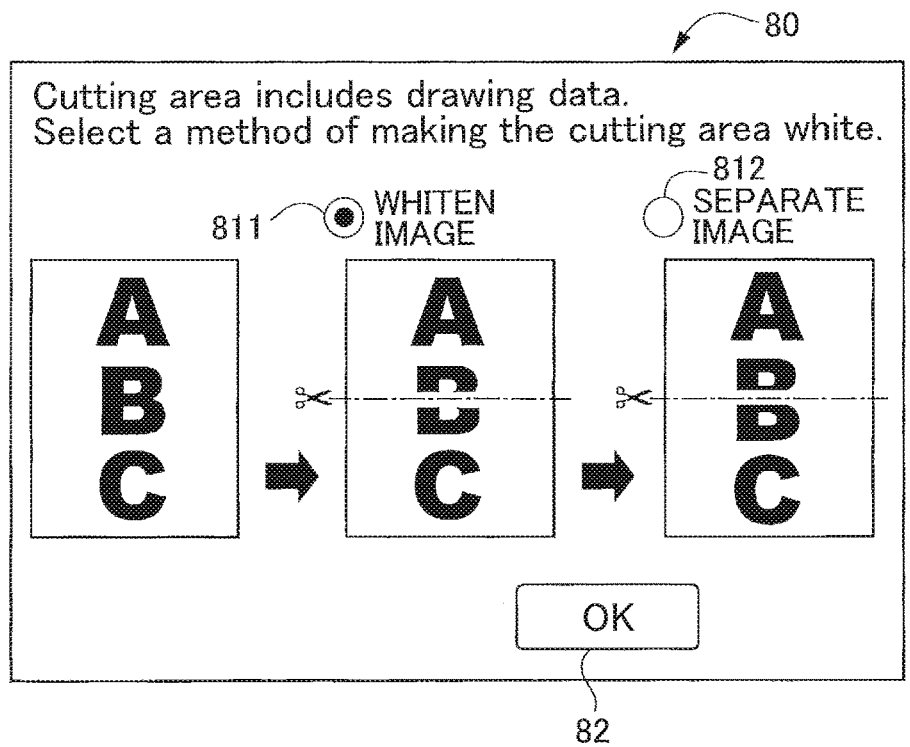
FIG. 12 is an explanatory diagram illustrating one example of a selection screen.

FIG. 12 illustrates a sample selection screen 80. The selection screen 80 in FIG. 12 includes a radio button 811 for receiving the selection "Whiten image" and a radio button 812 for receiving the selection "Separate image" as methods of making the cutting area white, sample images showing printed matter corresponding to the radio buttons, and an OK button 82. "Whiten image" is a method of overwriting the location targeted for white-out with a solid white image, while "Separate image" is a method of reducing the size of the image and dividing the image into upper and lower parts, leaving a gap in the location targeted for white-out. Subsequently, the CPU 11 waits until the OK button 82 in the displayed selection screen 80 has been operated.

In S303 the CPU 11 determines which of the radio buttons 811 and 812 is selected when the OK button 82 is operated. When the CPU 11 determines that the radio button 811 has been selected (S303: Whiten image), in S306 the CPU 11 generates a processed image by changing the image data in the target location to white data. The process of Step S306 is one example of the generation process of the present disclosure. The location changed to white data becomes a gap area in which no colorant is deposited during printing. The gap area can be easily formed in the image to be printed simply by overwriting the area with a solid white image. Since the gap area is set in reference to the center position so as to be larger than the margin of the cutting error of the printer 3 through this process, the adherence of colorant on the cutter 35 of the printer 3 is more reliably suppressed.

However, when drawing data in a color other than white is present in the area to be overwritten by the solid white image, that drawing data will be lost when overwritten by the solid white image, resulting in a loss of information. In the present embodiment, a message indicating this loss of drawing data is displayed in the selection screen 80, enabling the user to recognize that data in the center location will be lost. In this case, the selection screen 80 is one example of the notification screen providing notice to the user that drawing data will be lost, and displaying the selection screen 80 is one example of the notification process of the present disclosure. Here, the selection screen 80 may be configured to accept not only a selection for the white-out method, but also a selection for canceling the print.

After completing the process of S306 or when determining in S301 that no drawing data in a color other than white is present in the location targeted for white-out (S301: NO), in S307 the CPU 11 rasterizes the image data to generate rasterized image data of a size corresponding to an A4-size sheet and in S308 pastes the rasterized image data into the print data area to generate print data.

Figure 13:
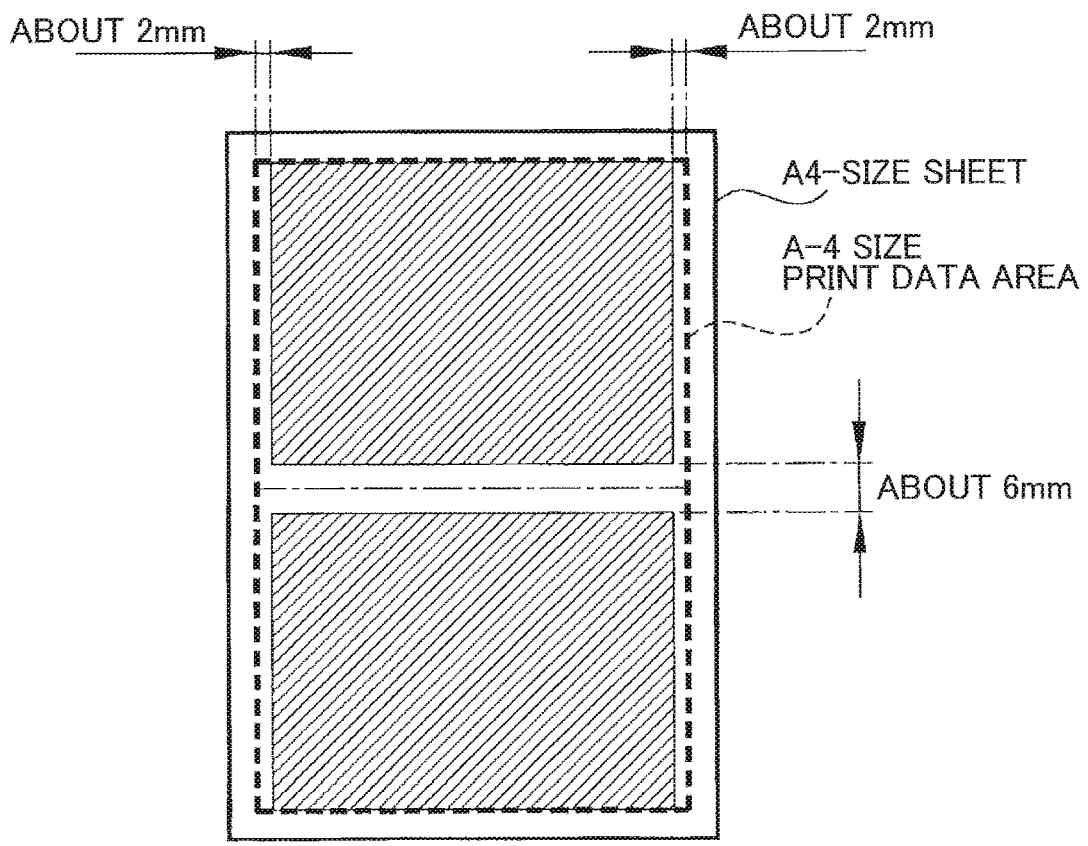
FIG. 13 is an explanatory diagram illustrating one example of a location in a sheet of a print data area for pasting rasterized image data.

The print data generated in S307 has a size corresponding to the entirety of the A4-size print data area created in S201 of the one-page single-sided process and is pasted over the entire print data area. When the printer 3 executes a print based on this print data, the image is printed on an A4-size sheet at a size that leaves a prescribed margin around the periphery, as indicated by the dashed line in FIG. 13, for example, similar to a case in which a normal A4-size image is printed on an A4-size sheet.

On the other hand, when the CPU 11 determines that the radio button 812 is selected when the OK button 82 is operated (S303: Separate image), in S311 the CPU 11 rasterizes the image data to generate rasterized image data of a size corresponding to approximately 98% of the A4 size. The process of Step S311 is one example of the reduction process of the present disclosure. In S312 the CPU 11 generates processed image data representing a processed image from the rasterized image data to paste the processed image data into the print data area to generate print data. The processed image is provided with a gap area in the longitudinal center position. The gap area is an area of the processed image in which no image exists. In other words, the gap area is an area in the print data area where no image data is to be pasted. The process of Step S312 is one example of the separation process of the present disclosure. This gap area can be easily formed by dividing the image being printed into two parts and separating the parts. After completing the process in S308 or S312, the CPU 11 ends the white-out process and returns to the one-page single-sided process.

Note that the rasterized image data generated in S311 is smaller than the print data area both vertically and horizontally. In S312 the CPU 11 pastes the rasterized image data into the print data area, as indicated by shading formed of diagonal lines in FIG. 13, so as to leave a gap of about 2 mm on both edges along the short sides and a gap of about 6 mm in the longitudinal center. Specifically, the CPU 11 pastes the rasterized image data from a position rightward by a number of dots corresponding to 2 mm from the left edge of the print data area and, after pasting half the rasterized image data, begins pasting the next line of print data from a position below the pasted rasterized image data by a number of dots corresponding to about 6 mm. When the printer 3 executes a print based on the print data generated in this way, the left and right margins are each about 2 mm larger than the margins formed in the white-out method, and a gap area of about 6 mm including the longitudinal center of the sheet surface is formed. Since the gap area is set in reference to the center position so as to be larger than the margin of cutting error on the printer 3 in this case, colorant is more reliably suppressed from becoming deposited on the cutter 35 of the printer 3.

Note that rather than performing the process in S311 described above, the CPU 11 may rasterize the image data without reducing the data size and in S312 may paste the rasterized image data into the print data area with a gap formed in the longitudinal center. In this case, the CPU 11 may omit lines corresponding to approximately 3 mm on the top edge of the rasterized image data and lines corresponding to approximately 3 mm on the bottom edge of the rasterized image data from being pasted into the print data area. Alternatively, the CPU 11 may set the lines corresponding to approximately 6 mm from only the top edge or only the bottom edge as rasterized image data not to be pasted into the print data area. In this way, a gap area having a length in the longitudinal direction of the sheet that accounts for the margin of cutting area can be formed in the center location. However, in such cases information may be lost when drawing data extends into the omitted lines. On the other hand, reducing the image size as described above can suppress the loss of information due to drawing data extending beyond the top and bottom of the image when the image is separated.

Instead of accepting a user selection in the selection screen 80, the printer driver 23 may perform the white-out process according to a predetermined method. In this case, the printer driver 23 may notify the user that the white-out process will be executed and may perform this predetermined process rather than display the selection screen 80 in S302 of the white-out process. For example, when "Whiten image" is set as the predetermined method, the printer driver 23 may notify the user for a prescribed time in a pop-up display that the center portion of the image, i.e., the cutting location, will be lost and may subsequently execute the whiten image process. The process of displaying the notification screen in a pop-up window is one example of the notification process of the present disclosure.

Figure 10:
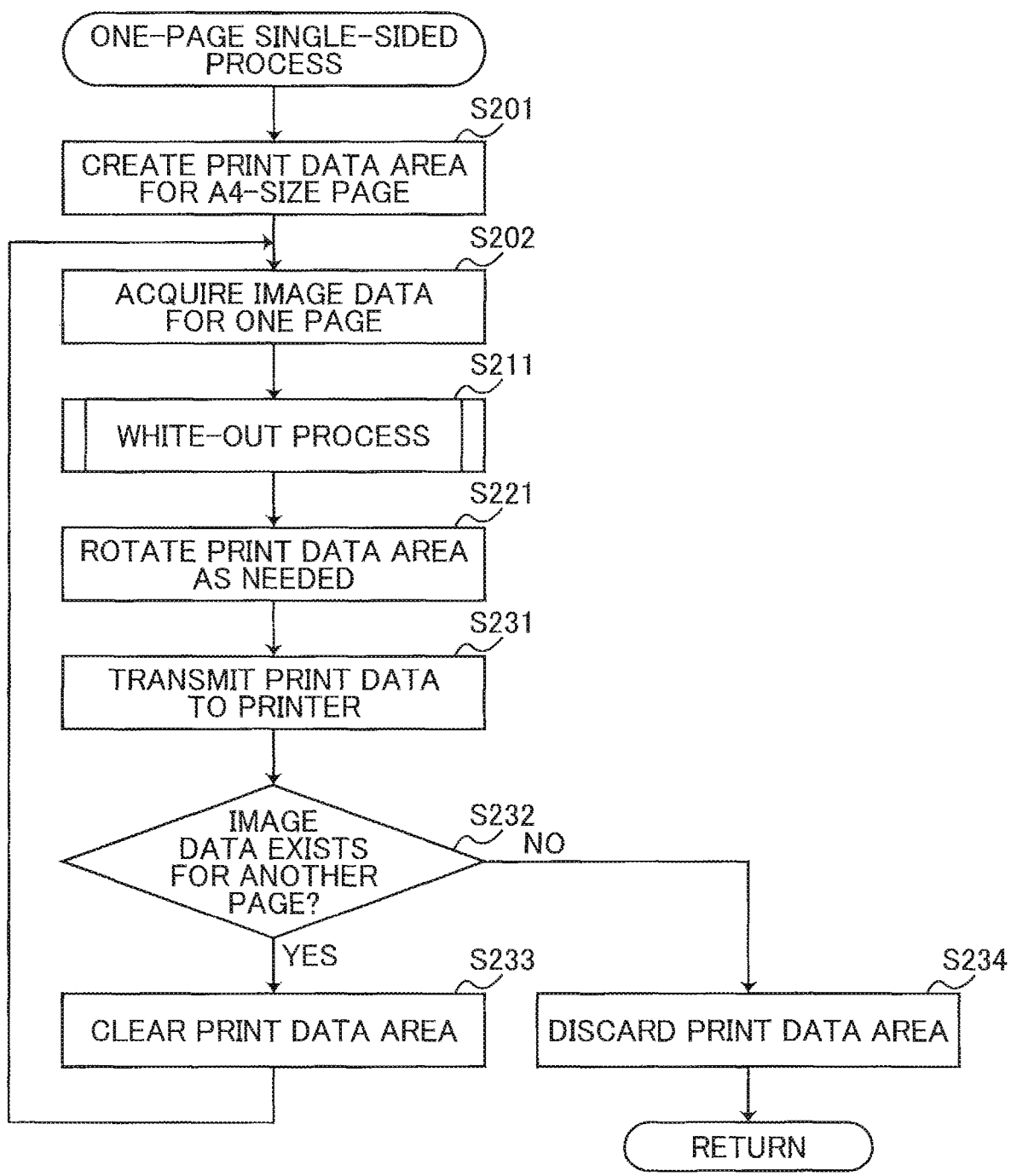
FIG. 10 is a flowchart illustrating steps in a one-page single-sided process.

Returning to the description of the one-page single-sided process in FIG. 10, after completing the white-out process of S211, in S221 the CPU 11 rotates the print data area as needed. Specifically, the CPU 11 rotates the print data area 180 degrees when the reverse order has been set in the print settings and does not rotate the print data area when the normal order is set. In S231 the CPU 11 encodes and transmits the print data generated by being pasted in the print data area to the printer 3. The process of Step S231 is one example of the transmission process of the present disclosure.

In S232 the CPU 11 determines whether image data exists for another page. When there is other image data (S232: YES), in S233 the CPU 11 clears the print data area and returns to S202 to acquire image data for the next page. The second and subsequent times the white-out process is performed the CPU 11 skips steps S302 for displaying the selection screen and S303 for receiving a user operation and applies the selection results found the first time the white-out process was performed. Since the user may become annoyed at repeated notifications, no more notifications are given for the current job after the first notification to prevent the user from having an unpleasant experience. Once the CPU 11 determines in S232 that no more image data exists (S232: NO), in S234 the CPU 11 discards the print data area, ends the one-page single-sided process, and returns to the printing process in FIG. 8.

When receiving print data, the printer 3 uses one page worth of print data to print an image on one A4-size sheet, and then drives the cutter 35 to cut the printed sheet in half at a midpoint along the longitudinal direction, i.e., the conveying direction of the sheet. Since the gap area provided in the white-out process by applying a white image or separating the image in the cutting location reduces the likelihood of colorant becoming deposited on the cutter 35 in the printer 3 during printing, more specifically, during cutting.

The leading-edge side of the print data area holds data that is printed first and, in a single-sided print, becomes the front portion of the sheet in the conveying direction. As described above, after cutting a sheet, the printer 3 discharges the front portion of the sheet in the conveying direction first and discharges the rear portion of the sheet in the conveying direction on top of the front portion. FIGS. 14A through 14D illustrate the layout order of printed matter created on the printer 3 in examples of print data generated based on five pages worth of image data.

Figure 14A:
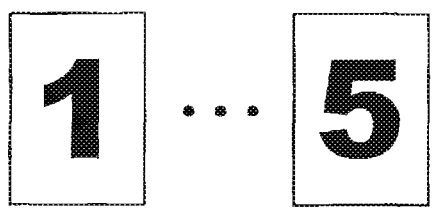
FIGS. 14A through 14D are explanatory diagrams each of which illustrates a layout order of printed matter created on the printer.
Figure 14A:
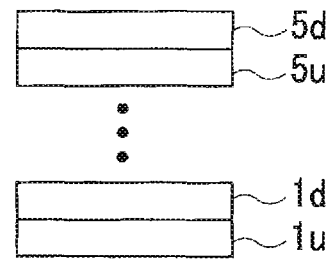
Figure 14B:
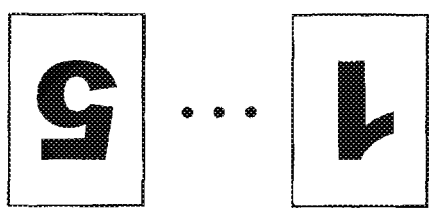
Figure 14B:
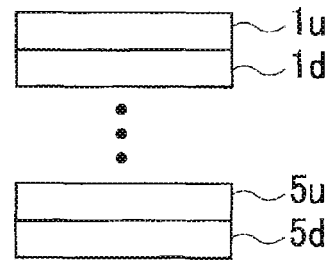

When the print settings specify portrait and normal order printing, the printer driver 23 transmits the print data area to the printer 3 without rotation. As a result, the top half of the first page (1u) is printed and discharged first, and the bottom half of the first page (1d) is discharged on top of this top half (1u), as illustrated in FIG. 14A. When the print settings specify portrait and reverse order printing, the printer driver 23 rotates the print data area 180 degrees before transmitting the print data area to the printer 3. As a result, the bottom half of the last page (5d) is printed and discharged first, and the top half of the last page (5u) is discharged on top of this bottom half (5d), as illustrated in FIG. 14B. By rotating the image when the reverse order is set, the bottom half of the image becomes the front portion of the printed matter, and the top half of the printed matter is stacked on top of the bottom half.

Figure 14C:
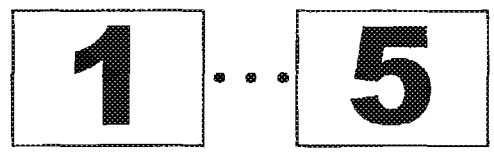
Figure 14C:
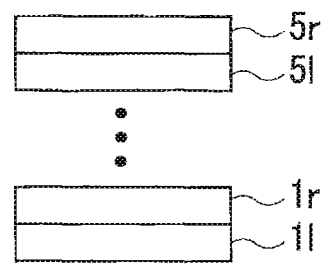
Figure 14D:
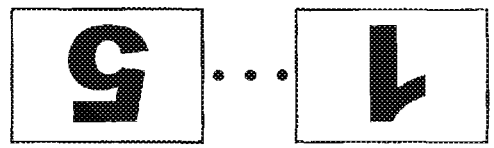
Figure 14D:
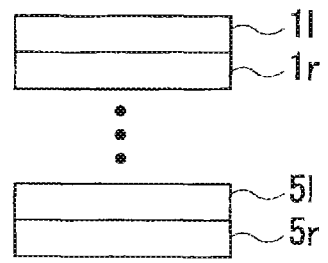

When the print settings specify landscape and normal order printing, the printer driver 23 transmits the print data area to the printer 3 without rotation. As a result, the left half of the first page (1l) is printed and discharged first, and the right half of the first page (1r) is discharged on top of the left half (1l), as illustrated in FIG. 14C. When the print settings specify landscape and reverse order printing, the printer driver 23 rotates the print data area 180 degrees before transmitting the print data area to the printer 3. As a result, the right half of the last page (5r) is printed and discharged first, and the left half of the last page (5l) is discharged on top of the right half (5r), as illustrated in FIG. 14D.

Returning to the description of the printing process in FIG. 8, when the CPU 11 determines in S116 that duplex print is selected in the print settings (S116: YES), in S118 the CPU 11 executes a two-page duplex process. In the two-page duplex process, the CPU 11 generates print data for printing one page worth of an A4-size image on each side of an A4-size sheet and transmits the generated print data to the printer 3.

Figure 15:
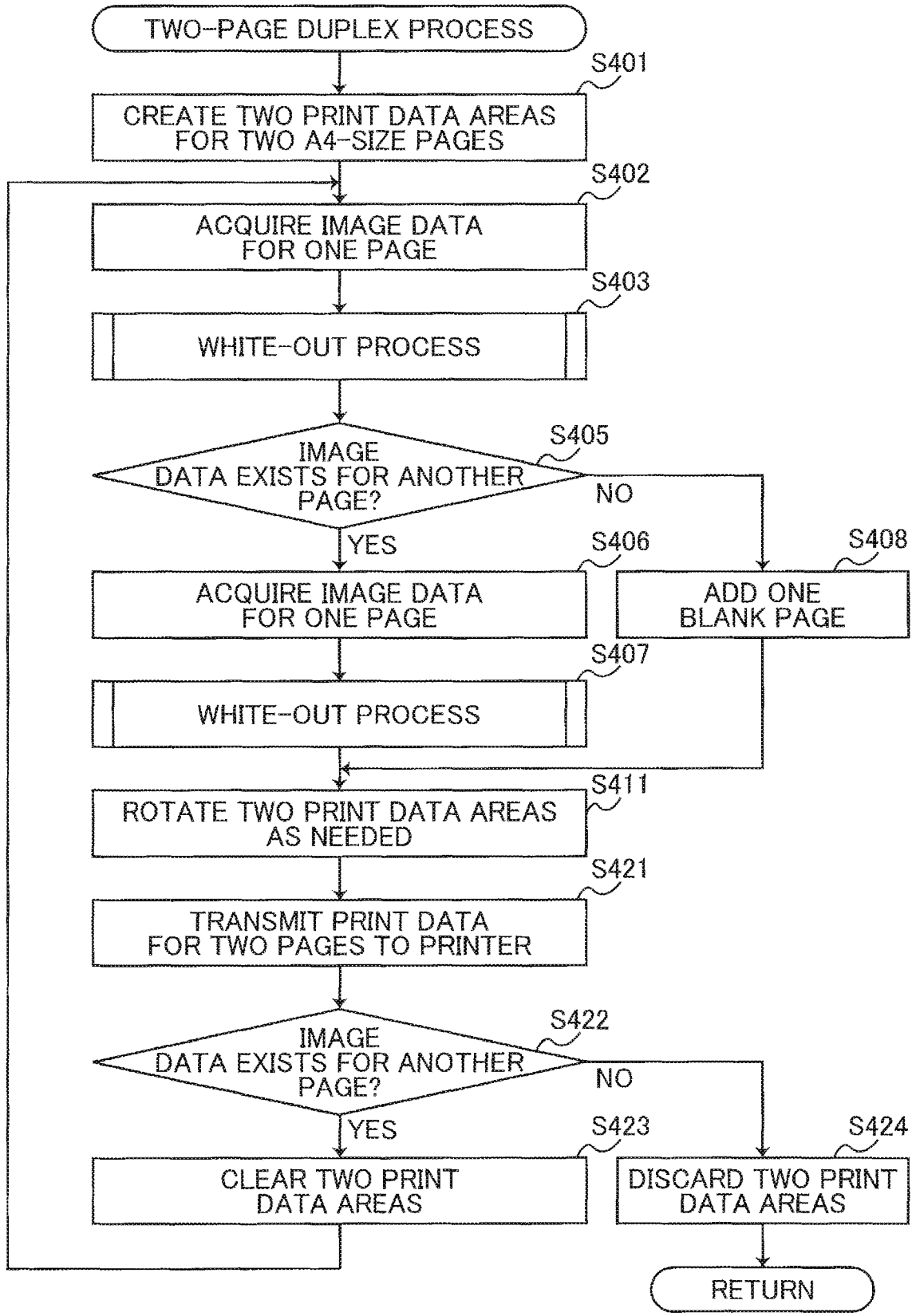
FIG. 15 is a flowchart illustrating steps in a two-page duplex process.

Steps in the two-page duplex process will be described next with reference to the flowchart in FIG. 15. In S401 of the two-page duplex process, the CPU 11 allocates area in the memory 12 of a predetermined size to create two A4-size print data areas. In S402 the CPU 11 first acquires image data for one page and in S403 executes the white-out process. The white-out process is the same process described above with reference to FIG. 11.

In S405 the CPU 11 determines whether image data exists for other pages. When the CPU 11 determines that image data exists for another page (S405: YES), in S406 the CPU 11 acquires image data for the next page and in S407 executes the white-out process. As in the one-page single-sided process, the CPU 11 skips steps S302 and S303 of the white-out process when the process is executed the second and subsequent times. On the other hand, when image data does not exist for other pages (S405: NO), in S408 the CPU 11 adds one blank page.

In S411 the CPU 11 rotates the print data areas of the two pages as needed. In S421 the CPU 11 encodes and transmits the two pages worth of print data generated by being pasted in the print data areas for two pages to the printer 3. The process of Step S421 is one example of the transmission process of the present disclosure.

Specifically, when long-edge binding has been set, the CPU 11 rotates only the print data area for the first side 180 degrees so that the image for the first page and the image for the second page are oriented opposite each other relative to the conveying direction of the sheet. Alternatively, when short-edge binding has been set, the CPU 11 rotates both print data areas for the first and second sides 180 degrees so that the image for the first page and the image for the second page have the same orientation relative to the conveying direction of the sheet. The print data area for the first side is generated based on the image data acquired first, and the printer 3 prints the first side first. Since the PC 1 of the present embodiment generates processed images with the orientation of the image on the back side corresponding to whether long or short-edge binding is set, the printer 3 can output printed matter with suitable duplex printing. Note that the binding direction in the two-page duplex process is set based on the long or short side of the original A4-size image rather than the long or short side of the image after cutting.

In S422 the CPU 11 determines whether image data exists for other pages. When the CPU 11 determines that image data exists for another page (S422: YES), in S423 the CPU 11 clears both print data areas and returns to S402 to acquire image data for the next page. When the CPU 11 determines that no more image data exists (S422: NO), in S424 the CPU 11 discards both print data areas, ends the two-page duplex process, and returns to the printing process in FIG. 8.

When receiving print data, the printer 3 uses two pages worth of print data to print images on both sides of one A4-size sheet, and then drives the cutter 35 to cut the printed sheet in half at a midpoint along the longitudinal direction, i.e., the conveying direction of the sheet. Since a gap area is also provided in the two-page duplex process by adding a white image or separating the image, this gap area can reduce the adherence of colorant on the cutter 35 of the printer 3 during printing, more specifically, during cutting.

FIGS. 16A through 16D illustrate the layout order of printed matter created on the printer 3 using examples of pasting positions for single-sided print data generated based on two pages worth of image data. When there are three or more pages worth of image data, the CPU 11 processes the image data for the third and subsequent pages in the same manner described in this example.

Figure 16A:
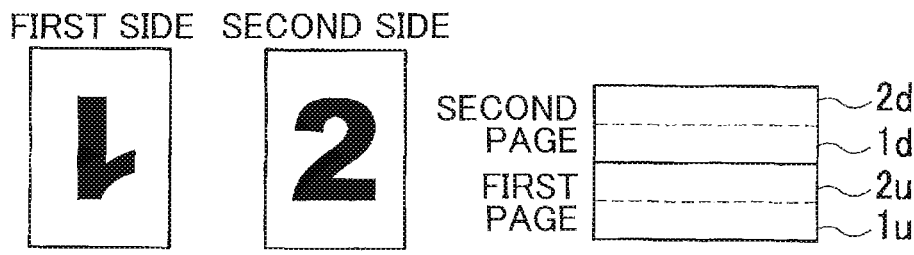
FIGS. 16A through 16D are explanatory diagrams each of which illustrates a layout order of printed matter created on the printer.

When long-edge binding and portrait printing have been set, the printer driver 23 transmits the print data to the printer 3 after rotating only the print data area for the first side, as illustrated in FIG. 16A. As a result, printed matter having the top half of the first page (1u) and the top half of the second page (2u) printed on opposite sides is discharged with the first page face down, and printed matter having the bottom half of the first page (1d) and the bottom half of the second page (2d) printed on opposite sides is discharged on top of the first printed matter with the first page face down.

Figure 16B:
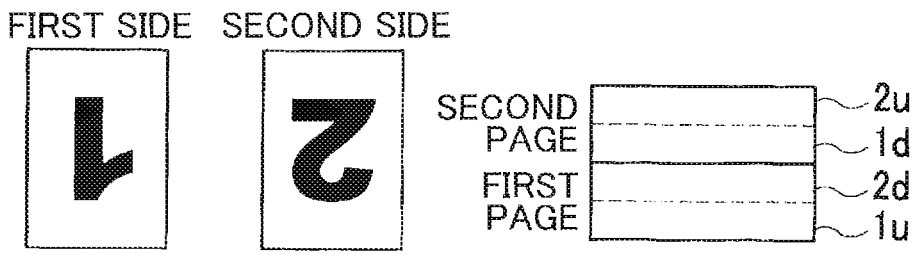

When short-edge binding and portrait printing have been set, the printer driver 23 rotates both print data areas for the first and second sides before transmitting the print data to the printer 3, as illustrated in FIG. 16B. As a result, printed matter having the top half of the first page (1u) and the bottom half of the second page (2d) printed on opposite sides is discharged with the first page face down, and printed matter having the bottom half of the first page (1d) and the top half of the second page (2u) printed on opposite sides is discharged on top of the first printed matter with the first page face down.

Figure 16C:
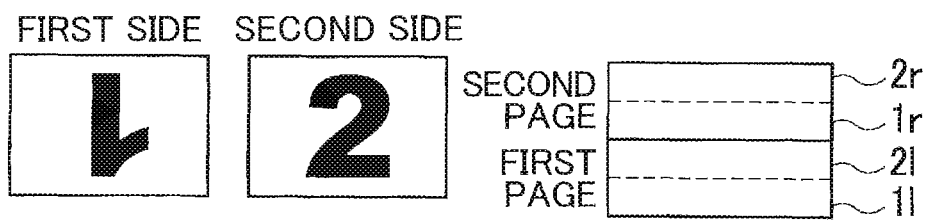

When long-edge binding and landscape printing have been set, the printer driver 23 transmits the print data to the printer 3 after rotating only the print data area for the first side, as illustrated in FIG. 16C. As a result, printed matter having the left half of the first page (1l) and the left half of the second page (2l) printed on opposite sides is discharged with the first page face down, and printed matter having the right half of the first page (1r) and the right half of the second page (2r) printed on opposite sides is discharged on top of first printed matter with the first page face down.

Figure 16D:
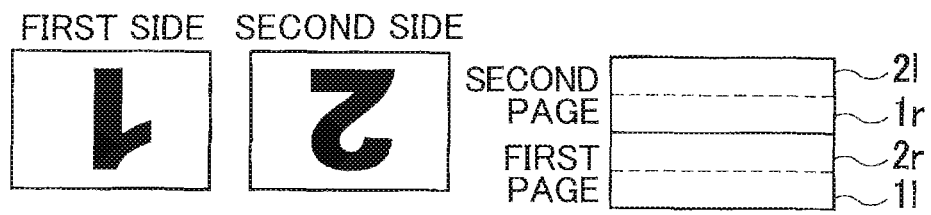

When short-edge binding and landscape printing have been set, the printer driver 23 transmits the print data to the printer 3 after rotating both print data areas for the first and second sides, as illustrated in FIG. 16D. As a result, printed matter having the left half of the first page (1l) and the right half of the second page (2r) printed on opposite sides is discharged with the first page face down, and printed matter having the right half of the first page (1r) and the left half of the second page (2l) printed on opposite sides is discharged on top of the first printed matter with the first page face down.

Returning to the description of the printing process in FIG. 8, when the CPU 11 determines in S111 that the document size is the A5 size (S111: A5) or when the CPU 11 determines in S111 that the document size is the A4 size (S111: A4) and determines in S112 that the A4 reduce and cut setting is selected (S112: YES) or when the CPU 11 determines in S108 that the Print button 72 is operated in the guidance screen 70 while the radio button 712 is selected (S108: Reduction), in S121 the CPU 11 transmits a cut command to the printer 3. The process in S121 is identical to the process in S115.

In S122 the CPU 11 determines whether duplex print is selected in the print settings. When the CPU 11 determines that duplex print is not selected (S122: NO), in S123 the CPU 11 executes a two-page single-sided process. In the two-page single-sided process, the CPU 11 generates print data for printing two pages worth of A5-size images on one side of an A4-size sheet and transmits the generated print data to the printer 3.

Figure 17:
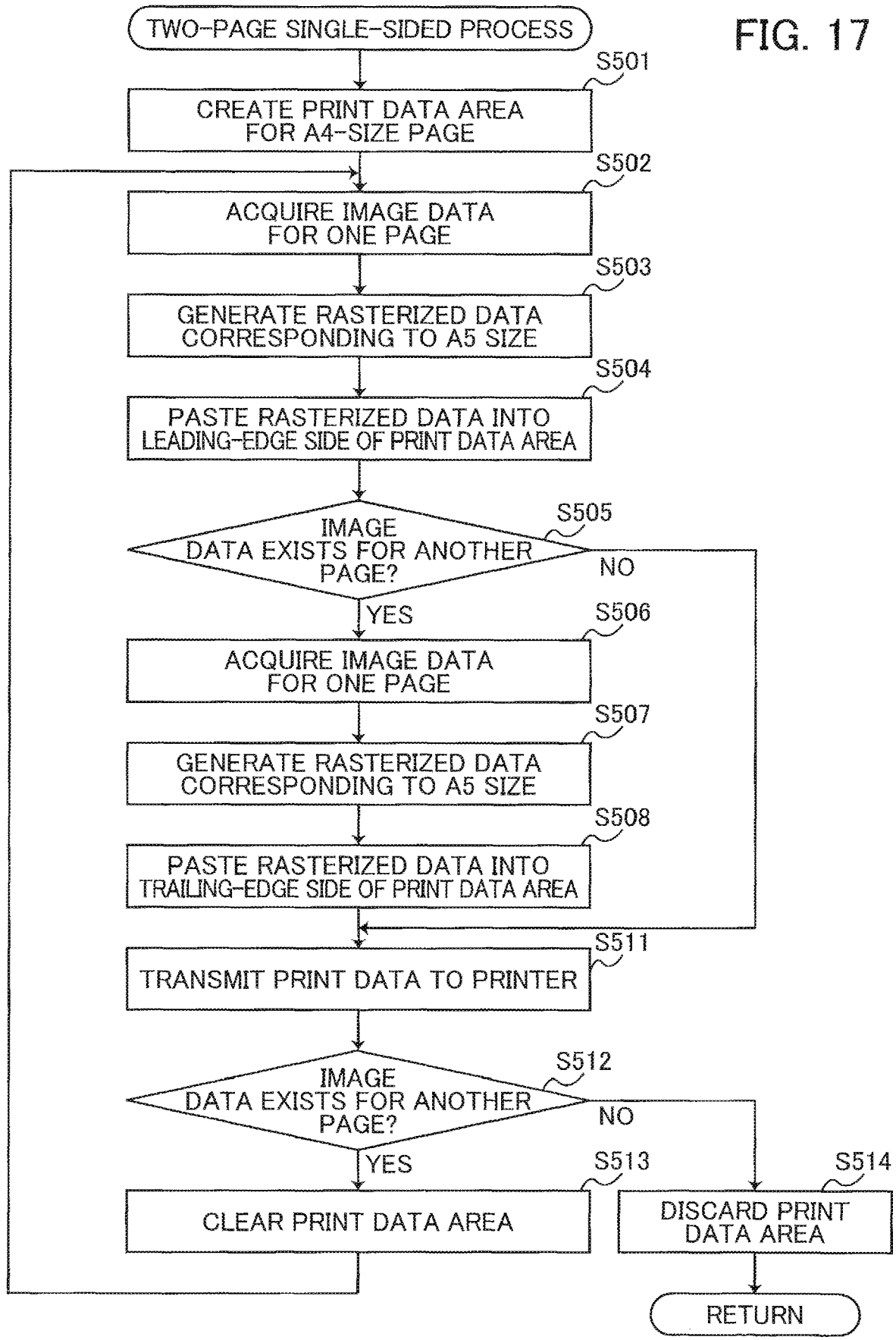
FIG. 17 is a flowchart illustrating steps in a two-page single-sided process.

Steps in the two-page single-sided process will be described next with reference to the flowchart in FIG. 17. In S501 at the beginning of this process, the CPU 11 allocates an area in the memory 12 of a predetermined size to create a print data area for pasting rasterized image data to generate A4-size print data.

In S502 the CPU 11 acquires one page worth of image data from the image data generated by the editing app 22 and in S503 rasterizes the image data to produce rasterized image data of a size corresponding to the A5 size. When the document size is A4 size, the CPU 11 generates rasterized image data of a reduced image. When the document size is A5 size, the CPU 11 generates rasterized image data without reduction. Since rasterized image data of an appropriate size is generated based on the document size, there is greater flexibility in the size of image that can be printed, improving convenience for the user. In S504 the CPU 11 pastes the rasterized image data into the leading-edge side of the print data area to generate print data corresponding to the leading-edge side of an A4-size sheet. In the two-page single-sided process, the CPU 11 does not rotate the image.

In S505 the CPU 11 determines whether image data exists for another page. When there is other image data (S505: YES), in S506 the CPU 11 acquires image data for the next page, in S507 rasterizes the image data to produce rasterized image data of a size corresponding to the A5-size as in S503, and in S508 pastes the rasterized image data into the trailing-edge side of the print data area to generate print data corresponding to the trailing-edge side of the A4-size sheet while providing a gap area between the leading-edge side and trailing-edge side to account for cutting error. By reducing and consolidating two pages worth of A4-size images or by consolidating two pages worth of A5-size images and arranging the two pages in an A4-size print data area, the printed matter having two pages worth of images printed in a single print can be obtained. Further, since rasterized image data based on the image data acquired first is arranged in the leading-edge side while rasterized image data based on image data acquired last is arranged in the trailing-edge side of the print data area, printed matter based on the image data acquired first is outputted first. Hence, the order of output follows the output order prioritized in the editing app 22.

Steps S504 and S508 generate layout image data representing a layout image in which two pages of A5-size images are arranged adjacent to each other in the longitudinal direction of the A4-size print data area with a gap area formed between the two and pastes the layout image data into the print data area to generate print data of the A4 size. After completing the process in S508 or when the CPU 11 determines in S505 that no image data remains (S505: NO), in S511 the CPU 11 encodes and transmits the print data generated by being pasted in the print data area to the printer 3.

Note that in S504 and S508 the CPU 11 provides a gap area to account for cutting error and pastes the rasterized image data at positions that add further space to the top and bottom in the longitudinal direction based on the difference between the A4 size and A5 size. The length of the long side of an A4-size sheet is 297 mm, which is 1 mm longer than twice the length of the short side of an A5-size sheet. Therefore, the CPU 11 pastes the rasterized image data in the print data area, as indicated by shading formed of diagonal lines in FIG. 18, while leaving blank spaces having a length one-fourth of this 1 mm difference, i.e., 0.25 mm, on both sides of each A5-size rasterized image data in the longitudinal direction of the print data area, for example.

Figure 18:
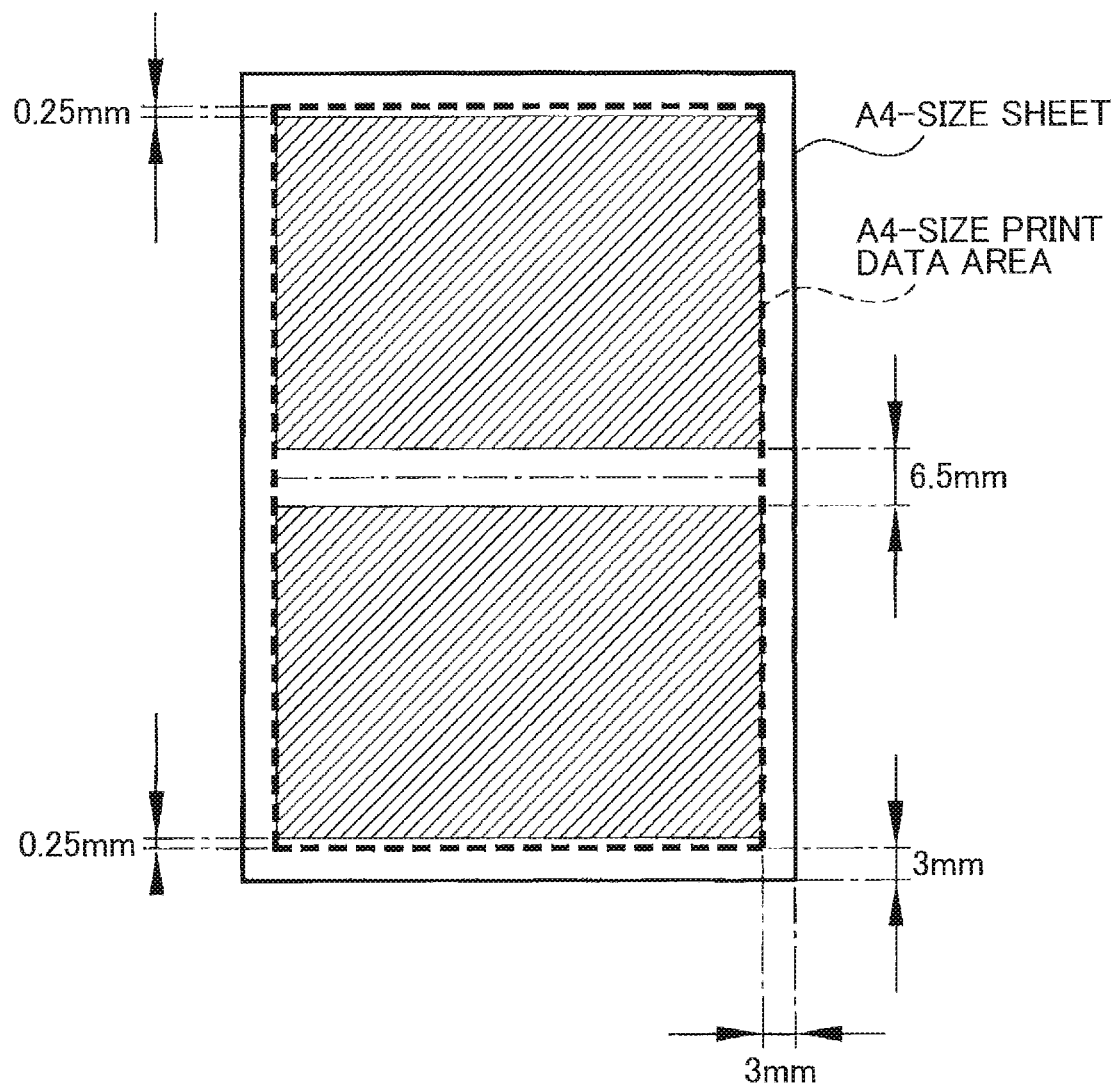
FIG. 18 is an explanatory diagram illustrating one example of a location in a sheet of a print data area for pasting rasterized image data.

FIG. 18 illustrates an example in which the margins are set to 3 mm, cutting error is ±3 mm, and the length of the gap area is 6 mm in the longitudinal direction of the sheet. Since 0.25 mm of space is provided on each side of the gap area, a blank space of 6.5 mm is formed between the print data for the first page and the print data for the second page. In other words, in this example, the CPU 11 pastes the rasterized image data for the first page beginning 0.25 mm below the top edge of the print data area and pastes the rasterized image data for the second page beginning 6.5 mm below the end of the first page. As a result, the margins on the leading edge and trailing edge are 3.25 mm each, while the length of the gap area including the blank spaces is 6.5 mm in the longitudinal direction of the sheet. Thus, the length of the gap area in this layout image is twice as large as the margins on the leading edge and trailing edge.

In S512 the CPU 11 determines whether image data exists for another page. If the CPU 11 determines that there is more image data (S512: YES), in S513 the CPU 11 clears the print data area and returns to S502 to acquire image data for the next page. However, if the CPU 11 determines that there is no more image data (S512: NO), in S514 the CPU 11 discards the print data area, ends the two-page single-sided process and returns to the printing process in FIG. 8. Through the two-page single-sided process, the CPU 11 generates print data in which are arranged two pages worth of A4-size images reduced to the A5 size or two pages worth of A5-size images and transmits this print data to the printer 3.

When receiving print data, the printer 3 prints two pages of images on one side of an A4-size sheet based on the print data, and then drives the cutter 35 to cut the printed sheet in half at a midpoint along the longitudinal direction, i.e., the conveying direction of the sheet. By printing and cutting based on the print data received from the PC 1, the printer 3 can create two sheets of A5-size printed matter through a simple process.

When the printer 3 executes a print based on this print data, the top and bottom margins are each 0.25 mm wider than the 3 mm setting and a 6.5-mm wide gap area is formed at the longitudinal center of the sheet. This gap area provided at the center position between the image for one page and the image for the other page suppresses colorant from adhering to the cutter 35 of the printer 3 during printing, more specifically, during cutting. Further, since the length of the gap area in the example of FIG. 18 is twice the length of the margins on both edges in the longitudinal direction of the sheet, the lengths of all margins of the cut sheets are consistent in the longitudinal direction of the sheet when the printed sheet is cut at a center position in the length of the gap area. This results in printed matter having a good appearance with a balanced arrangement of images.

Figure 19A:
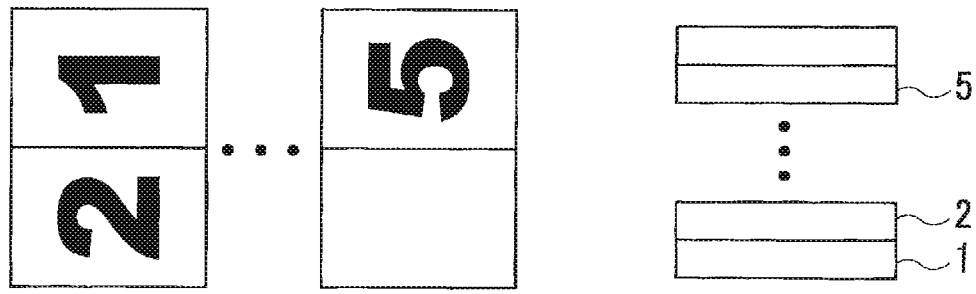
FIGS. 19A through 19D are explanatory diagrams each of which illustrates a layout order of printed matter created on the printer.
Figure 19B:
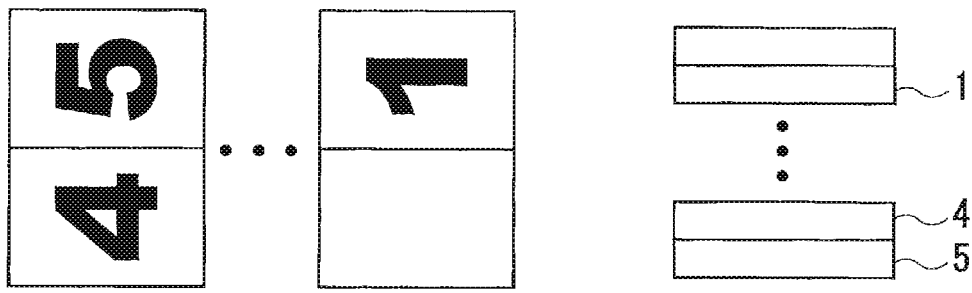
Figure 19C:
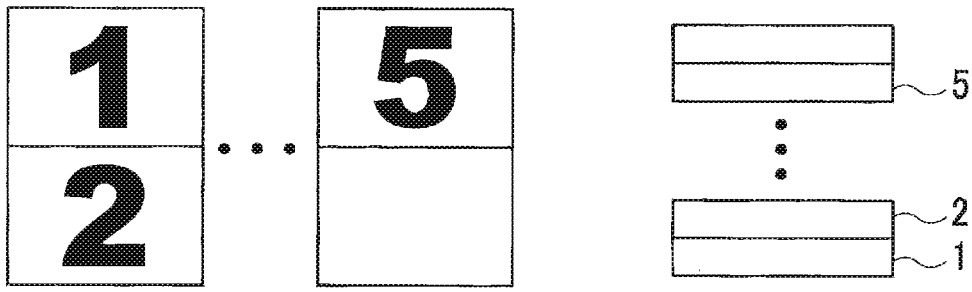
Figure 19D:
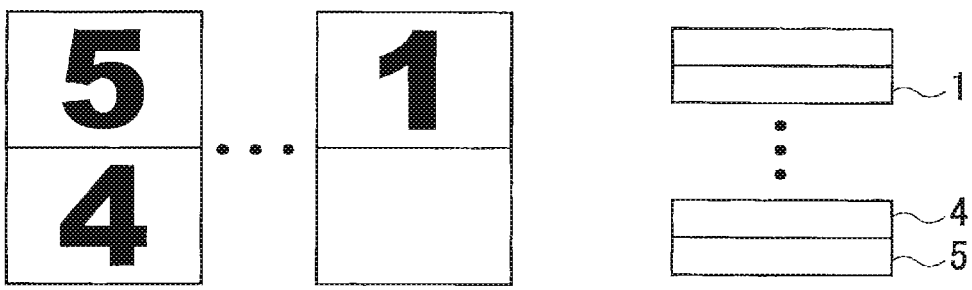

FIGS. 19A through 19D illustrate the layout order of printed matter created on the printer 3 using examples of print data generated based on five pages worth of image data. When the normal order has been set, regardless of whether portrait or landscape printing has been selected, printed matter is stacked in order with the first page on the bottom, as illustrated in FIGS. 19A and 19C. When the reverse order has been set, regardless of whether portrait or landscape printing has been selected, the printed matter is stacked in order with the last page on the bottom, as illustrated in FIGS. 19B and 19D.

Returning to the description of the printing process in FIG. 8, if the CPU 11 determines in S122 that duplex print is selected in the print settings (S122: YES), in S124 the CPU 11 executes a four-page duplex process. In the four-page duplex process, the CPU 11 generates print data for printing two pages of A5-size images on each side of an A4-size sheet for a total of four pages and transmits the generated print data to the printer 3.

Figure 20:
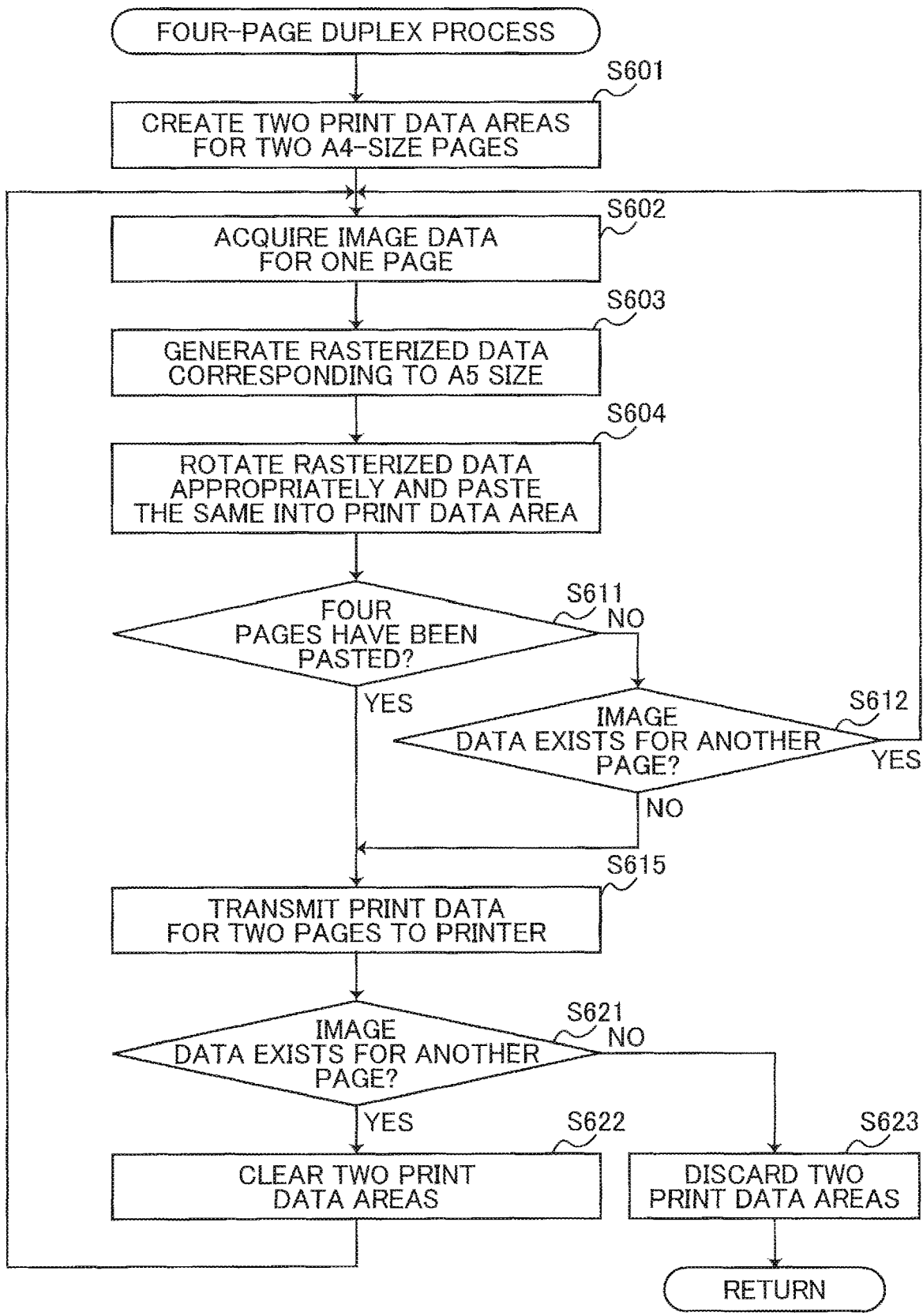
FIG. 20 is a flowchart illustrating steps in a four-page duplex process.

Steps in the four-page duplex process will be described next with reference to the flowchart in FIG. 20. In S601 at the beginning of this process, the CPU 11 allocates area in the memory 12 of a predetermined size to create two print data areas for pasting rasterized image data to generate print data for two A4-size pages.

In S602 the CPU 11 acquires one page worth of image data from the image data generated by the editing app 22 and in S603 rasterizes the image data to produce print data of a size corresponding to the A5 size. The process in S603 is identical to the process described in S503 and S507 of the two-page single-sided process in FIG. 17. In S604 the CPU 11 rotates the rasterized image data appropriately and pastes the rasterized image data at a prescribed location in the print data area. As in the two-page single-sided process, in the four-page duplex process the CPU 11 generates layout image data representing a layout image with a gap area and pastes the layout image data as in the example of FIG. 18. Rotation of the image will be described later.

In S611 the CPU 11 determines whether rasterized image data for four pages has been pasted. When the CPU 11 determines that not all four pages have been pasted (S611: NO), in S612 the CPU 11 determines whether image data exists for another page. When the CPU 11 determines that image data does exist (S612: YES), the CPU 11 returns to S602, acquires image data for the next page, rasterizes the image data, and pastes the rasterized data in the print data area. By repeating the process in S604, the CPU 11 generates print data for a layout image in each of the two print data areas having two pages worth of A5-size images arranged adjacent to each other in the longitudinal direction of the A4-size print data area.

When the CPU 11 determines in S611 that all four pages have been pasted (S611: YES) or when the CPU 11 determines in S612 that image data does not exist for another page (S612: NO), in S615 the CPU 11 encodes and transmits the two pages worth of print data generated by being pasted in the print data areas for two pages to the printer 3.

In S621 the CPU 11 determines whether image data exists for other pages. When the CPU 11 determines that more image data exists (S621: YES), in S622 the CPU 11 clears the print data areas and returns to S602 to acquire image data for the next page. However, when the CPU 11 determines that no more image data exists (S621: NO), in S623 the CPU 11 discards the print data areas, ends the four-page duplex process, and returns to the printing process in FIG. 8.

When receiving print data, the printer 3 prints images on both sides of an A4-size sheet, and then drives the cutter 35 to cut the printed sheet in half at a midpoint along the longitudinal direction, i.e., the conveying direction of the sheet. The gap area provided in the center of the sheet in the four-page duplex process suppresses colorant from adhering to the cutter 35 in the printer 3 during printing, more specifically, during cutting. In the present embodiment, after printing one side of a sheet based on print data for the first side, the printer 3 inverts the sheet while conveying the sheet back along the conveying path R2 and conveying path R1 and subsequently prints the other side based on print data for the second side. Thus, an image represented by the image data in the trailing-edge side of the print data area for the second side is printed on the back of the page printed according to image data in the leading-edge side of the print data for the first side.

In order to obtain printed matter having the second page printed on the back side of the first page and the fourth page printed on the back side of the third page, the printer driver 23 of the present embodiment rotates the images being pasted, as illustrated in FIGS. 21A through 21D. FIGS. 21A through 21D illustrate examples of pasting positions for two sides of print data generated based on four pages worth of image data. The binding direction in the four-page duplex process is determined based on either the long side or short side of the sheet after cutting, which is the long side or short side of the original image.

Figure 21A:
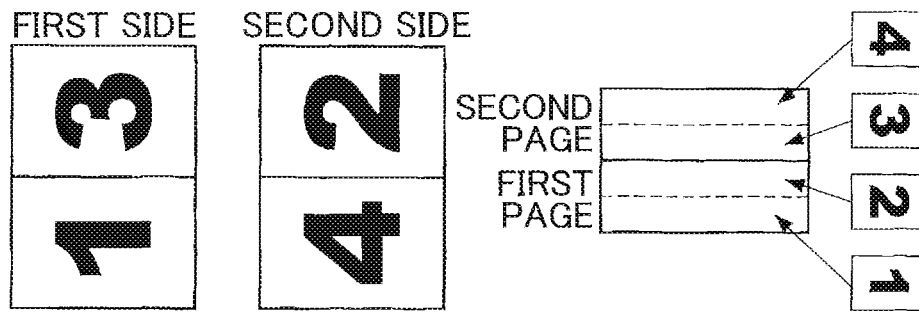
FIGS. 21A through 21D are explanatory diagrams each of which illustrates a layout order of printed matter created on the printer.

When long-edge binding and portrait printing have been set, as shown in FIG. 21A, the printer driver 23 rotates the rasterized image data for the first page 90 degrees counterclockwise and pastes the data in the trailing-edge side of the print data area for the first side. Further, the printer driver 23 rotates the rasterized image data for the second page 90 degrees counterclockwise and pastes the data in the leading-edge side of the print data area for the second side. Further, the printer driver 23 rotates the rasterized image data for the third page 90 degrees counterclockwise and pastes the data in the leading-edge side of the print data area for the first side. Further, the printer driver 23 rotates the rasterized image data for the fourth page 90 degrees counterclockwise and pastes the data in the trailing-edge side of the print data area for the second side. In this case, all images for the first through fourth pages are oriented in the same direction. As a result, printed matter having the first page and second page printed on opposite sides with long-edge binding is discharged with the first page face down, and printed matter having the third page and fourth page printed on opposite sides with long-edge binding is discharged on top of the first printed matter with the third page face down.

Figure 21B:
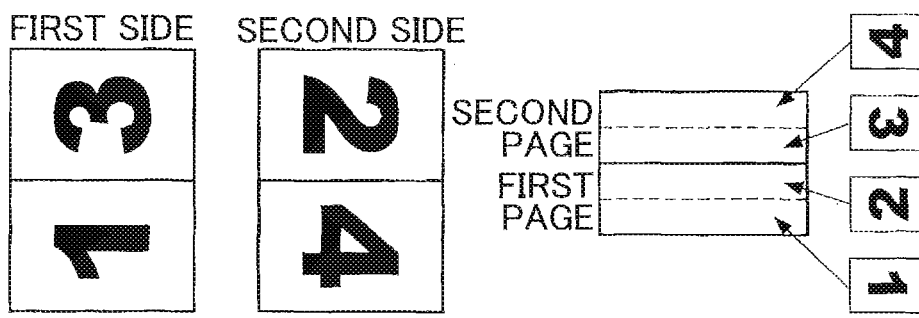

When short-edge binding and portrait printing have been set, as illustrated in FIG. 21B, the printer driver 23 rotates the rasterized image data for the first page 90 degrees counterclockwise and pastes the data in the trailing-edge side of the print data area for the first side. Further, the printer driver 23 rotates the rasterized image data for the second page 90 degrees clockwise and pastes the data in the leading-edge side of the print data area for the second side. Further, the printer driver 23 rotates the rasterized image data for the third page 90 degrees counterclockwise and pastes the data in the leading-edge side of the print data area for the first side. Further, the printer driver 23 rotates the rasterized image data for the fourth page 90 degrees clockwise and pastes the data in the trailing-edge side of the print data area for the second side. In this case, the images for the second page and fourth page are oriented in opposite directions from the images for the first page and third page. As a result, printed matter having the first page and second page printed on opposite sides with short-edge binding is discharged with the first page face down, and printed matter having the third page and fourth page printed on opposite sides with short-edge binding is discharged on top of the first printed matter with the third page face down.

Figure 21C:
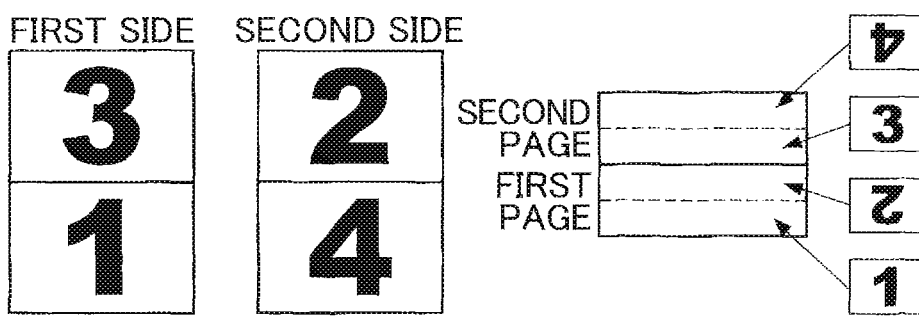

When long-edge binding and landscape printing have been set, as illustrated in FIG. 21C, the printer driver 23 pastes the rasterized image data for the first page with no rotation in the trailing-edge side of the print data area for the first side, and pastes the rasterized image data for the second page with no rotation in the leading-edge side of the print data area for the second side. Further, the printer driver 23 pastes the rasterized image data for the third page with no rotation in the leading-edge side of the print data area for the first side, and pastes the rasterized image data for the fourth page with no rotation in the trailing-edge side of the print data area for the second side. In this case, all images for the first through fourth pages are oriented in the same direction. As a result, printed matter having the first page and second page printed on opposite sides with long-edge binding is discharged with the first page face down, and printed matter having the third page and fourth page printed on opposite sides with long-edge binding is discharged on top of the first printed matter with the third page face down.

Figure 21D:
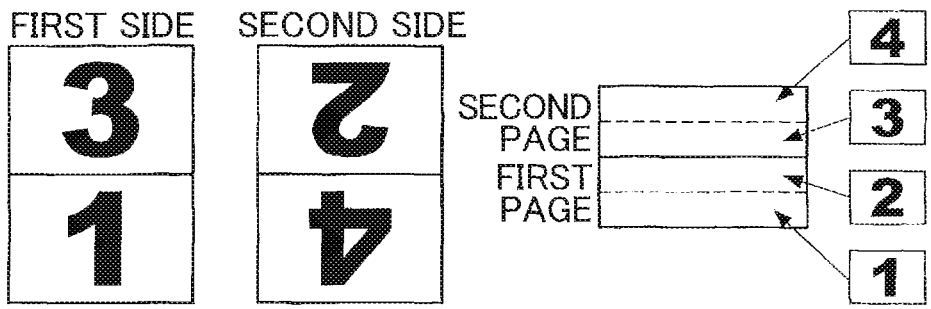

When short-edge binding and landscape printing have been set, as illustrated in FIG. 21D, the printer driver 23 pastes the rasterized image data for the first page with no rotation in the trailing-edge side of the print data area for the first side, and pastes the rasterized image data for the second page after rotating the print data 180 degrees in the leading-edge side of the print data area for the second side. Further, the printer driver 23 pastes the rasterized image data for the third page with no rotation in the leading-edge side of the print data area for the first side, and pastes the rasterized image data for the fourth page after rotating the data 180 degrees in the trailing-edge side of the print data area for the second side. In this case, images for the second page and fourth page are oriented in the opposite direction from images for the first page and third page. As a result, printed matter having the first page and second page printed on opposite sides with short-edge binding is discharged with the first page face down, and printed matter having the third page and fourth page printed on opposite sides with short-edge binding is discharged on top of the first printed matter with the third page face down.

Returning to the description of the printing process in FIG. 8, after the CPU 11 completes any of the one-page single-sided process of S117, the two-page duplex process of S118, the two-page single-sided process of S123, and the four-page duplex process of S124, in S131 the CPU 11 notifies the editing app 22 that the printing process is finished and ends the printing process. As described above, the printer driver 23 in the present embodiment can accept a selection through the guidance screen 70 (see FIG. 9) indicating whether to set a cut print and can modify the cut print setting based on the user selection. This configuration improves user convenience since the user can print using a cut print without having to cancel the print job and start over.

Returning to the description of the sequence diagram in FIG. 3, when the printer driver 23 transmits print data and a print command to the printer 3 according to the printing process, in P31 the printer 3 executes a print, as described above. If the print settings include a cut print setting, the printer driver 23 transmits a cut command to the printer 3 prior to the print data. Accordingly, in P32 the printer 3 drives the cutter 35 after printing to cut the printed sheet at the center position, and subsequently discharges the cut sheets.

As described above in detail, with the printer driver 23 of the present embodiment, the PC 1 generates processed image data representing a processed image from image data representing an image to be printed at A4 size to provide a gap area in which the printer 3 does not deposit colorant at a location that includes the longitudinal center and transmits print data based on this processed image data to the printer 3 in association with a cut command. The printer 3 prints the processed image on a sheet based on the print data received from the PC 1 and cuts the printed sheet at the center position. Accordingly, the gap area in which no colorant is deposited is formed at the location to be cut by the printer 3, thereby suppressing colorant from adhering to the cutter 35 of the printer 3.

Further, according to the printer driver 23 of the present embodiment, the PC 1 arranges rasterized image data corresponding to two A5-size pages side-by-side in the sheet conveying direction of the printer 3, pastes this data in an A4-size print data area, and transmits the print data generated by being pasted in this print data area to the printer 3 in association with a cut command. The printer 3 prints a sheet based on the print data received from the PC 1 and cuts the printed sheet in half, thereby outputting A5-size printed matter with respective images printed in page units. This eliminates the need for the printer 3 to perform a process for arranging images, thereby reducing the load on the printer 3.

The printer driver 23 of the present embodiment also provides special sizes associated with cut print settings as paper sizes and directs the editing app 22 to display the special size options. When the printer driver 23 receives a print instruction with a special size selected through the editing app 22, the printer driver 23 generates an image of a cut print according to the cut print setting associated with the selected special size and transmits print data representing this cut print image to the printer 3. In other words, the user can complete a cut print setting simply by selecting a special size in the editing app 22. This eliminates the need for the user to perform a setting operation via the settings screen 50 of the printer driver 23 to set the cut print or an operation to open this settings screen 50, thereby reducing the user's time and effort required for performing a cut print.

While the invention has been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the invention. Therefore, the disclosure is intended to embrace all known or later developed alternatives, modifications, variations, improvements, and/or substantial equivalents. Some specific examples of potential alternatives, modifications, or variations in the described invention are provided below.

For example, the device that executes the program may be a smartphone or a tablet computer rather than the PC 1. Further, the PC 1 may be connected to two or more printers. The printer 3 is also not limited to a standalone printer, but may be a multifunction peripheral, a copier, a fax machine, or the like.

While the printer driver 23 in the embodiment described above is provided with three selectable cut print settings, the printer driver 23 may have just one selectable cut print setting or may have two selectable cut print settings including one of the A4 reduce and cut setting and the A5 cut setting, provided that at least the A4 cut setting is selectable. When only the A4 cut setting or the A4 cut setting and A4 reduce and cut setting are selectable cut print settings, a selectable cut print setting may only be accepted when the A4 size is selected as the document size, and a warning screen may be displayed to indicate that a cut print cannot be executed when the document size is changed to a size other than the A4 size. In this way, the PC 1 can avoid errors due to improper settings by not accepting settings for unsupported combinations.

In the present embodiment, a selection of the white-out method is only received when processing the first page of a print job, but a selection may be received for each page having drawing data in the center position. The selection screen may also be capable of accepting a selection for discontinuing notifications. Further, the timing of a notification when the white-out method is predetermined is not limited to the first page but may performed every page or after the final page has been transmitted. Further, the printer driver 23 is not limited to notifying the user through a pop-up display when the white-out method is predetermined but may use a window display that accepts a selection of whether to print or not, for example.

Further, in the present embodiment, for example, when generating processed image data representing a processed image by forming a gap therein, the gap is provided in the image after the image has been reduced in size and rasterized, and the image data is pasted in the print data area in the above embodiment. However, the image may be reduced and rasterized after generating the processed image data representing the processed image with a gap formed therein.

Further, the guidance screen 70 may have a checkbox for receiving a selection not to display the screen the next time, as illustrated in FIG. 9. If the printer driver 23 receives an operation in the Print button 72 while this checkbox is checked, the printer driver 23 stores information for not displaying the guidance screen and executes the print according to the received print settings without displaying the guidance screen in subsequent prints.

In the present embodiment, if the document size is changed while a cut print is set, a warning screen is displayed and the cut print setting is removed, but the present invention is not limited to this configuration. For example, if a cut print setting has been received, a change in the document size may not be accepted or may be canceled. Alternatively, the warning screen may be modified to accept a user selection on whether to employ the cut print or the selected document size.

When the reverse order has been set in the present embodiment, image data is acquired from the editing app 22 in the reverse order, but the printer driver 23 may also acquire image data from the editing app 22 in the normal order and rearrange the image data to the reverse order.

The margin sizes illustrated in this embodiment are merely examples. Further, the printer 3 may be capable of cutting a sheet at any specified position not restricted to the center position of the A4-size sheet based on an instruction from the printer driver 23. The printer 3 may also be capable of cutting sheets of sizes other than the A4 size.

In any of the flowcharts disclosed in the embodiment, the plurality of processes that make up any of the plurality of steps may be executed in parallel, or the order in which the processes are performed may be modified in any way that does not produce inconsistencies in the processes.

The processes disclosed in the embodiments may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A non-transitory computer-readable storage medium storing a set of computer-readable instructions installed on and executed by a computer in an information processing device, the information processing device including: a user interface configured to receive a user operation; a communication interface configured to communicate with a printer; and the computer, the printer having: a printing function for printing an image on a sheet of a printing medium while conveying the sheet in a first direction parallel to a longitudinal direction of the sheet; and a cutting function for cutting the printed sheet on which the image is printed, the set of computer-readable instructions, when executed by the computer, causing the information processing device to perform:
   a setting process to set, in response to receiving an instruction through the user interface, a cut print setting for printing an image on a sheet having a first size and dividing the printed sheet on which the image is printed at a center position of the printed sheet in the first direction into a first portion and a second portion, the sheet having a predetermined width in a second direction orthogonal to the first direction, the first portion and the second portion having a second size, wherein the set of computer-readable instructions, when executed by the computer, causes the information processing device to further perform:
   in response to receiving a print instruction in which the cut print setting is set:
      a generation process to acquire image data representing a target image corresponding to the first size to generate processed image data based on the image data, the processed image data representing a processed image in which a gap area is arranged within a range including the center position in the first direction and extending over the predetermined width in the second direction, no colorant being deposited in a region on a sheet corresponding to the gap area during the printer printing the processed image on the sheet; and
      a transmission process to transmit print data based on the processed image data generated in the generation process and a cut command to the printer, and
   wherein the printer is configured to print the processed image on a sheet having the first size and cut the printed sheet on which the processed image is printed at the center position of the printed sheet in the first direction in response to receiving the print data and the cut command.

2. The non-transitory computer-readable storage medium according to claim 1,
   wherein the processed image data represents the processed image obtained by overwriting the range in the target image with a solid white image.

3. The non-transitory computer-readable storage medium according to claim 2, wherein the set of computer-readable instructions, when executed by the computer, causes the information processing device to further perform:
   in response to receiving the print instruction in which the cut print setting is set:
      a notification process to make notification through the user interface indicating that drawing data will be lost when an image represented by the drawing data presents within the range in the target image.

4. The non-transitory computer-readable storage medium according to claim 3,
   wherein the image data comprises a plurality of sets of image data representing respective ones of a plurality of target images, the plurality of target images corresponding to a plurality of pages, and
   wherein the notification process includes determining whether any image presents within the range in each of the plurality of target images, and when the determining first determines that an image presents within the range in one of the plurality of target images, the notification is made for the one of the plurality of target images, whereas the notification is skipped for the others of the plurality of target images.

5. The non-transitory computer-readable storage medium according to claim 1,
   wherein the processed image data represents the processed image obtained by dividing the target image at the center position into a first partial image and a second partial image and separating the first partial image and the second partial image in the first direction to provide the gap area therebetween.

6. The non-transitory computer-readable storage medium according to claim 5,
   wherein the generation process comprises:

a reduction process to generate reduced image data representing a reduced target image obtained by reducing the target image; and a separation process to generate the processed image data representing the processed image obtained by dividing the reduced target image at the center position into the first reduced image and a second reduced image and separating the first reduced image and the second reduced image in the first direction to provide the gap area therebetween.

7. The non-transitory computer-readable storage medium according to claim 1, wherein the set of computer-readable instructions, when executed by the computer, causes the information processing device to further perform:

a duplex setting process to set, in response to receiving an instruction through the user interface, a duplex print setting for printing an image on each of a first surface and a second surface of a sheet and one of a long-edge binding setting and a short-edge binding setting, wherein when the print instruction in which the duplex print setting is set is received, the generation process acquires two pages worth of image data including first page data and second page data, and generates the processed image data including first processed image data based on the first page data and second processed image data based on the second page data, the first page data representing a first target image and corresponding to a first page, the second page data representing second target image and corresponding to a second page immediately following the first page, the first processed image data representing a first processed image to be printed on the first surface of the sheet and in which the gap area is arranged within the range, the second processed image data representing a second processed image to be printed on the second surface of the sheet and in which the gap area is arranged within the range, wherein when the long-edge binding setting is set along with the duplex print setting in the print instruction, the generation process generates the processed image data such that the first processed image is oriented in the opposite direction from the second processed image, and wherein when the short-edge binding setting is set along with the duplex print setting in the print instruction, the generation process generates the processed image data such that the first layout image is oriented in the same direction as the second processed image.

8. The non-transitory computer-readable storage medium according to claim 1, wherein in the printer, the cutting function is available when the printed sheet has the first size, whereas the cutting function is not available when the printed sheet has a size other than the first size, and wherein in the setting process, the cut print setting can be set when the first size is selected as a target image size of the target image, whereas the cut print setting cannot be set when a size other than the first size is selected as the target image size.

9. The non-transitory computer-readable storage medium according to claim 1, wherein in the printer, the cutting function is available when the printed sheet has the first size, whereas the cutting function is not available when the printed sheet has a size other than the first size, and wherein the set of computer-readable instructions, when executed by the computer, causes the information processing device to perform:

a warning process to issue a warning via the user interface in response to receiving a selection to select a size other than the first size as a target image size while the cut print setting is set in the setting process.

10. The non-transitory computer-readable storage medium according to claim 1, wherein the first size is the A4 size.

11. The non-transitory computer-readable storage medium according to claim 1, wherein the generation process sets a length of the gap area in the first direction in reference to the center position so as to be larger than a margin of cutting error in the first direction on the printer.

* * * * *